United States Patent
Babcock et al.

(10) Patent No.: US 7,957,160 B2
(45) Date of Patent: Jun. 7, 2011

(54) CURRENT WAVEFORM CONSTRUCTION TO GENERATE AC POWER WITH LOW HARMONIC DISTORTION FROM LOCALIZED ENERGY SOURCES

(75) Inventors: Paul M. Babcock, Spokane Valley, WA (US); David J. Babcock, Spokane Valley, WA (US); Phillip N. Smith, Spokane Valley, WA (US)

(73) Assignee: Flyback Energy, Inc., Spokane Valley, WA (US)

( * ) Notice: Subject to any disclaimer, the term of this patent is extended or adjusted under 35 U.S.C. 154(b) by 309 days.

(21) Appl. No.: 12/233,432

(22) Filed: Sep. 18, 2008

(65) Prior Publication Data

US 2009/0073726 A1     Mar. 19, 2009

Related U.S. Application Data

(60) Provisional application No. 60/973,224, filed on Sep. 18, 2007.

(51) Int. Cl.
*H02M 3/335* (2006.01)
*H02H 7/125* (2006.01)

(52) U.S. Cl. ............... 363/16; 363/21.02; 363/21.03; 363/56.01; 363/97; 363/131

(58) Field of Classification Search ............ 363/16, 363/21.02, 21.03, 56.01, 97, 131
See application file for complete search history.

(56) References Cited

U.S. PATENT DOCUMENTS

| | | |
|---|---|---|
| 3,581,117 A | 5/1971 | Dixon |
| 3,614,474 A | 10/1971 | Hahn et al. |
| 4,055,789 A | 10/1977 | Lasater |
| 4,160,920 A | 7/1979 | Courier Méré |
| 4,330,742 A | 5/1982 | Reimers |
| 4,549,121 A | 10/1985 | Gale |
| 4,565,938 A | 1/1986 | Fawzy |
| 4,581,543 A | 4/1986 | Herberg |
| 4,651,066 A | 3/1987 | Gritter et al. |

(Continued)

FOREIGN PATENT DOCUMENTS

DE         3425414 A1     1/1986

(Continued)

OTHER PUBLICATIONS

U.S. Appl. No. 60/973,224, filed Sep. 18, 2007, Babcock.

(Continued)

*Primary Examiner* — Bao Q Vu
(74) *Attorney, Agent, or Firm* — Thompson Patent Law Offices PC; Craige Thompson

(57) ABSTRACT

Methods and apparatus to provide low harmonic distortion AC power for distribution by converting energy from natural or renewable sources into electrical form, and constructing a current waveform on a primary winding of a transformer by recapturing inductive energy previously stored in the transformer so as to transform the converted electrical energy into substantially sinusoidal AC voltage at a secondary winding of the transformer. For example, AC power may be supplied to a utility power grid from raw electrical energy from renewable energy sources (e.g., solar cells). An inverter may construct the primary winding current waveform using two unidirectional switches. On each half cycle, one of the switches first applies energy previously recaptured from primary winding inductance, and then applies the raw energy to the transformer primary winding at the utility power grid frequency. Accordingly, the constructed primary winding current may exhibit substantially improved total harmonic distortion.

13 Claims, 16 Drawing Sheets

U.S. PATENT DOCUMENTS

| | | | |
|---|---|---|---|
| 4,661,747 A | | 4/1987 | Gray, Sr. |
| 4,663,547 A | | 5/1987 | Baliaa et al. |
| 4,763,053 A | | 8/1988 | Rabe |
| 4,768,075 A | | 8/1988 | Breich et al. |
| 4,816,891 A | | 3/1989 | Nishizawa |
| 4,947,071 A | | 8/1990 | Clarke |
| 5,003,241 A | | 3/1991 | Rowan et al. |
| 5,047,913 A | * | 9/1991 | De Doncker et al. ........... 363/95 |
| 5,329,195 A | | 7/1994 | Herber et al. |
| 5,334,898 A | | 8/1994 | Skybyk |
| 5,449,989 A | | 9/1995 | Correa et al. |
| 5,554,903 A | | 9/1996 | Takara |
| 5,568,368 A | * | 10/1996 | Steigerwald et al. ........... 363/17 |
| 5,682,086 A | * | 10/1997 | Moo et al. ...................... 315/247 |
| 5,717,562 A | | 2/1998 | Antone et al. |
| 5,773,908 A | | 6/1998 | Stephens et al. |
| 6,166,500 A | | 12/2000 | Makaran |
| 6,175,484 B1 | | 1/2001 | Caruthers et al. |
| 6,266,257 B1 | * | 7/2001 | Geissler ...................... 363/56.05 |
| RE37,576 E | | 3/2002 | Stephens et al. |
| 6,380,707 B1 | | 4/2002 | Rosholm et al. |
| 6,384,553 B1 | | 5/2002 | Liu |
| 6,389,169 B1 | | 5/2002 | Stark et al. |
| 6,392,370 B1 | | 5/2002 | Bedini |
| 6,717,827 B2 | | 4/2004 | Ota |
| 7,126,833 B2 | * | 10/2006 | Peng .............................. 363/132 |
| 7,336,512 B2 | * | 2/2008 | Geissler ........................... 363/89 |
| 7,427,841 B2 | | 9/2008 | Hamaoka et al. |
| 7,602,157 B2 | | 10/2009 | Babcock et al. |
| 7,778,056 B2 | * | 8/2010 | Geissler ........................... 363/89 |
| 2001/0017493 A1 | | 8/2001 | Sakamoto |
| 2002/0097013 A1 | | 7/2002 | Bedini |
| 2003/0086619 A1 | | 5/2003 | Nagaishi |
| 2003/0099561 A1 | | 5/2003 | Heydt et al. |
| 2005/0163344 A1 | | 7/2005 | Kayahara et al. |
| 2005/0234323 A1 | | 10/2005 | Kayahara et al. |
| 2007/0146958 A1 | | 6/2007 | Babcock et al. |
| 2008/0067947 A1 | | 3/2008 | Leyh |
| 2009/0195199 A1 | | 8/2009 | Ito |

FOREIGN PATENT DOCUMENTS

| | | |
|---|---|---|
| EP | 0151199 | 8/1985 |
| EP | 0902527 | 3/1999 |
| FR | 2611098 | 8/1988 |
| JP | 60107917 | 6/1985 |
| JP | 9084352 A | 3/1997 |
| JP | 10066203 | 3/1998 |
| JP | 2004/280597 | 10/2004 |
| JP | 2005/050051 | 2/2005 |
| KR | 10-2007-0078524 | 8/2007 |
| WO | WO 95/31853 | 11/1995 |
| WO | WO 99/38247 | 7/1999 |

OTHER PUBLICATIONS

Agelidis et al., "A Low-Loss Full-Bridge PWM DC-DC Converter Topology," *Power Electronics Specialists Conference, 1993. PESC '93 Record., 24th Annual IEEE*, 1993, pp. 531-537.

Bell, "Active Clamp Resets Transformer in Converters," Power Electronics Technology, pp. 26-32, Jan. 2004.

Bendien et al., "Recovery Circuit for Snubber Energy in Power Electronic Applications with High Switching Frequencies," *IEEE Taransactions on Power Electronics*, 1988, 3(1):26-30.

"Beware of Zero-Crossover Switching of Transformers," Tyco Electronics Corporation-P&B, Application Note, pp. 1-2, believed to have been publicly available before the filed of this application.

Elasser et al., "Soft Switching Active Snubbers for dc/dc Converters," *IEEE Transactions on Power Electronics*, 1996, 11(5):483-489.

He et al., "A Simple Energy Recovery Circuit for High-Power Inverters With Complete Turn-On and Turn-Off Snubbers," *IEEE Transactions on Industrial Electronics*, 2004, 51(1):81-88.

He, "An Improved Energy Recovery Soft-switching Turn-on/Turn-off Passive Boost Snubber with Peak Voltage Clamp," *Applied Power Electronics Conference and Exposition, 2000. APEC 2000. Fifteenth Annual IEEE*, 2000, 2:699-706.

International Search Report and Written Opinion in PCT/US2006/062664, mailed May 31, 2007, 13 pages.

International Preliminary Report on Patentability in PCT/US2006/062664, mailed Jul. 10, 2008, 8 pages.

Ivensky et al., "New Snubbers with Energy Recovery into a Local Power Supply," *Power Electronics Specialist Conference, 2003. PESC '03. 2003 IEEE 34th Annual*, 2003, 3:1327-1332.

Liu et al., "A Novel Energy Recycling Clamp Circuit," *Applied Power Electronics Conference and Exposition, 2005. APEC 2005. Twentieth Annual IEEE*, 2005, 2:1205-1209.

Mao et al., "Active-Clamp Snubbers for Isolated Half-Bridge DC-DC Converters," *IEEE transactions On Power Electronics*, 2005, 20(6) 1294-1302.

Okuma et al., "Novel Three-Phase SMR Converter with Inherent Snubber Energy Recovery Capability," *IEEE Transactions On Industry Applications*, 1996 32(2):326-334.

*The Transmission of Power*, Chapter 5, "The Power Transformer: Synthesis" pp. 132-173.

Thiyagarajah et al., "A High Switching Frequency IGBT PWM Rectifier/Inverter System for AC Motor Drives Operating from Single Phase Supply," *IEEE Transactions On Power Electronics*, 1991, 6(4):576-584.

Williams et al., "Passive Snubber Energy Recovery for a GTO Thyristor Inverter Bridge Leg," *IEEE Transactions on Industrial Electronics*, 2000, 47(1):2-8.

Bongwon Suh et al: "Automatic thumbnail cropping and its effectiveness" UIST 03. Proceedings of the 16TH Annual ACM Symposium on User Interface Software and Technology. Vancouver. Canada, Nov. 2-5, 2003, pp. 95-104, XP002367824.

Patent Abstracts of Japan, vol. 2003, No. 12, Dec. 5, 2003 & JP 2004/280597.

Patent Abstracts of Japan, vol. 2003, No. 12, Dec. 5, 2003 & JP 2005/050051.

Search Report Dated Mar. 16, 2007.

International Search Report and Written Opinion in PCT/US2008/076895, mailed May 13, 2009, 11 pages.

European Patent Office Action of Application No. 06851335.7 dated Apr. 16, 2010, 5 pages.

Grossner, Nathan, "Transformers for Electric Circuits," Feb. 1983, 2nd Ed., McGraw-Hill, pp. 132-173.

Applicant's Response to Office Action in Application No. 06851335.7, dated Aug. 5, 2010.

European Office Action of application No. EP06851335.7, dated Dec. 7, 2010, 3 pages.

* cited by examiner

592

| 200 Ohm Load 120VDC | Switch Pulse Width | Trans. Output Voltage | Trans. Output %THD |
|---|---|---|---|
| | 70% | 104VAC | 5% |
| | 73% | 110VAC | 4.2% |
| | 75% | 116VAC | 3.4% |
| | 78% | 120VAC | 2.52% |
| | 80% | 122VAC | 2.68% |
| | 83% | 124VAC | 3.2% |
| | 86% | 126VAC | 3.86% |

FIG. 5D

CURRENT WAVEFORM CONSTRUCTION TO GENERATE AC POWER WITH LOW HARMONIC DISTORTION FROM LOCALIZED ENERGY SOURCES

RELATED APPLICATIONS

This application claims benefit to U.S. Application Ser. No. 60/973,224, entitled "Solar Energy-Derived DC to High Voltage AC Conversion," as filed on Sep. 18, 2007 by Babcock, et al., the entire contents of which are fully incorporated by reference herein.

TECHNICAL FIELD

Various embodiments relate to power conversion systems and methods to construct waveforms to provide high quality AC electrical power suitable for delivery to a high voltage electrical distribution network, which sources in some implementations may include renewable or natural energy sources such as, by way of example and not limitation, wind, wave, solar, geothermal, and/or hydrokinetic sources of energy.

BACKGROUND

In general, an electric utility distribution system may be considered as a carefully tuned resonant energy pool, with generated electrical energy going into the pool in streams and consumed electrical energy leaving the pool in streams. Reliable operation (e.g., free of surges, stable voltage) can be achieved when the input electrical energy and the output electrical energy are substantially balanced. When a power generation system that feeds electrical energy to the grid exhibits substantial power output transients, the rest of the utility grid and distribution system may not have adequate time to adapt to the power level changes. As such, generator transients can contribute to grid instability.

For example, rapid changes in power output from one generator can cause other generators to warp or distort their outputs, which can result in voltage transients, voltage spikes, and/or undesired harmonic content. In some examples, this may lead to fault conditions at one or more substations in the grid. Such fault conditions can adversely affect both generators and consumers on the grid.

Accordingly, utility companies generally specify power generation standards that regulate the manner in which electrical power generators may deliver energy to the power grid and/or distribution system.

In some existing solar electric systems, solar arrays generate direct current (DC) electricity. To inject the electric energy onto the utility power grid, the generated DC energy is conducted via cables to a central point where it can then be converted to alternating current (AC) by large scale commercial inverters. Commercial inverters generally operate using high-frequency switch-mode technology to convert DC electricity to AC electricity. Such systems are believed to use a battery system to provide power regulation or to stabilize the AC voltage output during variations of DC power output by the solar arrays.

SUMMARY

Methods and apparatus to provide low harmonic distortion AC power for distribution by converting energy from natural or renewable sources into electrical form, and constructing a current waveform on a primary winding of a transformer by recapturing inductive energy previously stored in the transformer so as to transform the converted electrical energy into substantially sinusoidal AC voltage at a secondary winding of the transformer. For example, AC power may be supplied to a utility power grid from raw electrical energy from renewable energy sources (e.g., solar cells). An inverter may construct the primary winding current waveform using two unidirectional switches. On each half cycle, one of the switches first applies energy previously recaptured from primary winding inductance, and then applies the raw energy to the transformer primary winding at the utility power grid frequency. Accordingly, the constructed primary winding current may exhibit substantially improved total harmonic distortion.

Some examples may further lower harmonic distortion of the output voltage supplied from a secondary winding of the transformer by phase shifting a harmonic flux to substantially attenuate a harmonic flux coupled to a secondary winding of the transformer. In some examples, one or more harmonic fluxes may be substantially offset to reduce harmonic distortion of a substantially sinusoidal output voltage signal from the secondary of the transformer. The transformer includes a harmonic suppression winding to generate a phase shifted harmonic flux that substantially attenuates the corresponding harmonic flux that couples from the primary winding to the secondary winding. Each harmonic suppression winding is coupled to a circuit element through which current is substantially orthogonal to voltage of the winding at the fundamental frequency.

Various embodiments relate to power conversion systems and methods to convert energy from one or more localized sources to provide high quality AC electrical power suitable for delivery to a high voltage electrical distribution network, which sources in some implementations may include renewable or natural energy sources such as, by way of example and not limitation, wind, wave, solar, geothermal, and/or hydrokinetic sources of energy.

In various examples, operating a unidirectional switch at line frequency to provide unidirectional current flow to the primary winding of the transformer. Bidirectional current may be supplied to the transformer from two substantially identical switch modules, each having their output connected to the primary winding in opposite polarity.

Various embodiments may have one or more advantages. For example, some embodiments may substantially directly (e.g., through a single inverter and as little as a single transformer) process raw, variable DC voltage to substantially sinusoidal, high quality AC power suitable for delivery to one or more electric power distribution networks (e.g., utility grid). The process of inverting raw, variable DC power to high quality (e.g., THD less than 5%) using as few as one transformer stage may be achieved using line frequency switching, thereby substantially reducing switching losses and substantially reducing or eliminating generation of conducted or radiated electromagnetic interference from the inverter, which in turn eliminates the need for high frequency filtering of the power conversion circuits, thus reducing cost, size, weight, and component count, while improving manufacturability. Minimizing the number of transformer stages may reduce parts count, avoid substantial efficiency penalties, and variable output voltage can be regulated by simple selection of pulse width to produce a desired AC output voltage on the secondary side of the transformer.

In various embodiments, the switching process may yield further efficiency improvements by recapturing stored magnetic energy (e.g., primary winding leakage inductance) and reusing that energy to construct a primary current waveform with an improved harmonic profile.

In some implementations, the localized conversion of DC to high voltage AC may advantageously help reduce the cost of the cabling by reducing the amount, and therefore cost, of conductive materials (e.g., copper, aluminum) to build or maintain a large facility, such as the facility 100 of FIG. 1. At high voltage, AC power is capable of transporting electrical power over substantial distances using low current through small diameter conductors, without incurring substantial voltage drop and/or power dissipation due to resistance in the conductors.

In various examples, local storage of energy in capacitors may promote utility grid stability by providing short term support to ride through transient line conditions until the utility subsystems can react and adjust.

The details of one or more embodiments are set forth in the accompanying drawings and the description below. Other features and advantages will be apparent from the description and drawings, and from the claims.

DESCRIPTION OF DRAWINGS

This document describes these and other aspects in detail with reference to the following drawings.

Like reference symbols in the various drawings indicate like elements.

DETAILED DESCRIPTION OF ILLUSTRATIVE EMBODIMENTS

This document describes various aspects and examples of implementations that relate to collecting energy from natural or renewable sources, which are typically located at a number of locations that are not in close proximity to a collection point for interfacing to a utility.

In various embodiments, a facility for supplying power to an electrical distribution network, such as a utility grid, includes a number of energy collection nodes, each of which supplies raw, variable DC (or rectified AC) power to an inverter of the type described in U.S. patent Ser. No. 11/582,115, entitled "Supply Architecture for Inductive Loads," as filed on Oct. 16, 2006 by Babcock et al. The inverter module can capture flyback energy from energy stored in the inductance of a transformer, and then exploit the stored energy that might otherwise be lost to hysteresis and/or core heating, to yield an output voltage with low THD from the transformer secondary.

In various embodiments described herein, the inverter, which switches at line frequency (e.g., 60 Hz), shapes the current waveform supplied to a transformer primary by first recycling the captured flyback energy, and then capturing more flyback energy. The release and capture of flyback energy each half cycle helps to construct a more substantially sinusoidal (e.g., about 20% THD) current waveform. In some embodiments, the transformer includes a secondary winding for output, and a harmonic suppression winding that, when coupled to an appropriate capacitor, substantially reduces selected harmonics on the secondary output voltage. Thus, the inverter may drive the transformer to produce AC secondary voltage waveform with a nearly sinusoidal (e.g., less than 5% THD) voltage waveform. Over a substantially wide range of the raw DC input voltages from the energy collection node, output voltage levels may be well controlled by simply varying the pulse width of each half cycle, in various embodiments. Furthermore, the inverter is configured to reset the voltage and current to the transformer to zero on each half cycle, thereby substantially reducing or avoiding hysteresis and associated losses, as well as resonances that may contribute to radiated or conducted emissions.

Figure 1:
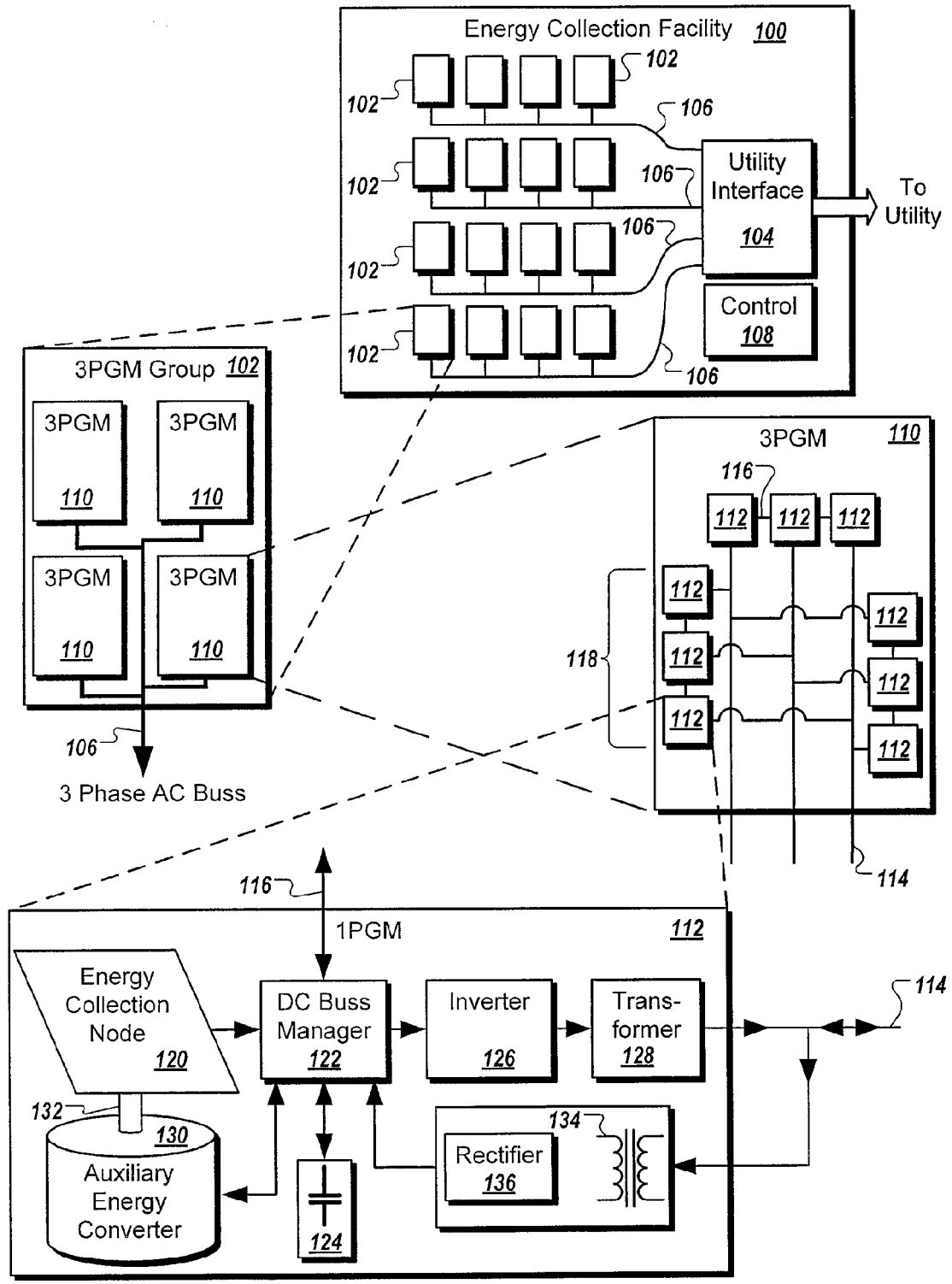
FIG. 1 shows an example energy collection facility that converts low-voltage DC power to high-voltage AC power at line frequency for supply to an electric distribution system.

FIG. 1 shows an example energy collection facility 100 that converts low-voltage DC power to high-voltage AC power at line frequency for supply to an electric distribution system. In general, the energy collection facility 100 collects solar power as varying levels of low voltage DC power, and intelligently routes that power to low frequency (e.g., 50 Hz or 60 Hz) inverters. The low frequency inverters convert the low voltage DC power to high-voltage AC power with levels of total harmonic distortion (THD) that are in some implementations low enough to satisfy some electric utilities' requirements for contributing power to their electrical grid. Examples of DC energy collection and conversion to AC power are discussed in further detail in U.S. Application Ser. No. 60/973,224, entitled "Solar Energy-Derived DC to High Voltage AC Conversion," as filed on Sep. 18, 2007 by Babcock, et al., the entire contents of which are fully incorporated by reference herein.

The energy collection facility 100 includes a collection of three-phase power generator module (3PGM) groups 102 that are connected to a utility interface 104 by a collection of 3 phase AC busses 106. Although many of the examples that will be discussed describe three phase power generation at 50 Hz and 60 Hz, other implementations are possible. For example, the 3PGM groups 102 can generate one, two, three, five, nine, twelve, or other number of AC power phases at 10 Hz, 20 Hz, 50 Hz, 60 Hz, 100 Hz, 300 Hz, or other AC frequencies. In some implementations, power generated by the 3PGM groups 102 can advantageously be conducted to the utility interface 104 as high voltage AC, with corresponding reduced current. Accordingly, power lost to resistance in lengthy conductor runs may be substantially reduced, as power loss is proportional to the square of current (i.e., Power loss=I*I*R).

The utility interface 104 transforms the three phase power generated by the 3PGM groups 102 to voltages, frequencies, phases, and/or currents that are compatible with a power utility. In some implementations, the utility interface 104 can include a transformer. For example, the utility interface 104 can be a transformer that accepts 33 kV AC power from the 3PGM groups 102 and steps the voltage up to the utilities' 110 kV transmission voltage. The power may interface in various forms of WYE, DELTA, or other desired configuration.

The energy collection facility 100 also includes a control module 108. The control module 108 controls various operations of the energy collection facility 100 that will be further discussed below in the description of FIG. 1.

Each of the 3PGM groups 102 includes a collection of 3PGMs 110. In some implementations, the 3PGM group 102 can include two, three, four, eight, ten, twelve, or other number of 3PGMs 110. In the depicted example, the output of the 3PGMs 110 is combined onto the three phase AC buss 106. For example, each 3PGM 110 can output 5KVAC at 20 KW, and the output of four 3PGMs 110 can be combined to output 5KVAC at 100 KW on the three phase AC buss 106. Additional examples of combinations of 3PGMs and 3PGM groups are discussed in the description of FIG. 2.

Each of the 3PGMs 110 includes a collection of single phase generator modules (1PGMs) 112. In the illustrated example, the 3PGM 110 includes nine 1PGMs 112, however other implementations may be used. In some implementations, the 3PGM can include three, four, five, six, nine, twelve, or other numbers of 1PGMs 112. The outputs of each of the 1PGMs 112 connect to a collection of single phase AC busses 114.

In some implementations, the 1PGMs 112 can be combined into banks of 1PGMs that are connected by a collection of inter-tie busses 116. In the illustrated example, the nine 1PGMs 112 are grouped into three inter-tied groups of three 1PGMs 112 each, such as a 1PGM inter-tie group 118. Each of the 1PGM inter-tie groups 118 includes three 1PGMs 112 connected by the inter-tie busses 116. Each of the 1PGMs 112 can deliver and/or draw DC power through the inter-tie busses 116. For example, each of the 1PGMs 112 is capable of providing single phase AC power to one of the single phase AC busses 114 while either providing or drawing DC power from the inter-tie buss 116.

In the illustrated example, three 1PGM inter-tie groups 118 and three single phase AC busses 114 are shown, but other implementations are possible. In some examples, the 3PGM 110 can include one, two, three, six, nine, twelve, or other numbers of the 1PGM inter-tie groups 118 and/or the single phase AC busses 114. In some implementations, the connections among the 1PGMs 112, the inter-tie busses 116, and/or the single phase AC busses 114 can be controlled by the control module 108. Methods and examples of various ways that the 1PGMs 112 can be connected to each other and to the single phase AC busses 116 are discussed in the descriptions of FIGS. 9 and 10.

The 1PGM 112 includes an energy collection node 120. In some implementations, the energy collection node 120 includes solar cells that collect solar energy to produce DC power. In other implementations, the energy collection node 120 can be a windmill, a tidal generator, a wave energy collector, a hydroelectric generator, a geothermal generator, or other sources of power that can be used to generate DC power.

The energy collection node 120 provides DC power to a DC buss manager 122. The DC buss manager 122 uses a capacitor 124 to stabilize the level of DC power provided by the energy collection node 120. The DC buss manager 122 is discussed in further detail with reference to FIG. 4. In an example of solar power collection, the output of the energy collection node 120 can vary as clouds pass, as the sun rises and sets, and other reasons. During periods of high power output, the DC buss manager 122 may divert and/or store some or all of the energy in the capacitor 124. During periods of reduced output, such as when a cloud shades the energy collection node 120, the DC buss manager 122 can use energy stored in the capacitor 124 to boost the amount of power output to an inverter module 126.

In various implementations, the capacitor 124 can be replaced or supplemented by one or more energy storage elements that can store excess energy output from the energy collection node 120, and provide temporary source of energy when the available output power from the energy collection node 120 is below a desired level. Such energy storage elements may store, for example, excess electrical energy by charging one or more battery cells, and/or may store mechanical energy in a flywheel energy storage system. In some implementations, energy storage elements may include, for example, systems that store energy in the form of compressed gas in a substantially enclosed container (e.g., underground reservoir, man-made containment systems), and/or as an elevated fluid, for subsequent energy recovery. For example, the DC buss manager 122 can store energy by pumping compressed air into storage vessels and/or underground voids, and later use the compressed gas to operate an electrical generator. In another example, the DC buss manager 122 can use excess DC power to pump water or other fluids to an elevated storage vessel, and later recover the potential energy when needed by allowing gravity to cause the water to spin a hydroelectric generator.

The inverter module 126 receives DC energy, processes the energy, and delivers AC power to a transformer 128. The inversion switches each operate at line frequency and produces AC power with a reduced (e.g., 5% or less) THD. The inverter module 126 is discussed in the description of FIG. 3a. Additional examples suitable for use as the inverter module 126 are also discussed in U.S. patent Ser. No. 11/582,115, entitled "Supply Architecture for Inductive Loads," as filed on Oct. 16, 2006 by Babcock et al., the contents of which are fully incorporated by reference herein.

The transformer 128 transforms the AC power provided by the inverter module 126 to a voltage and current level that can be conducted by the single phase AC buss 114. In some implementations, the transformer 128 can be configured to reduce the level of harmonics and THD in the output AC power. Examples of the transformer 128 are discussed in further detail with reference to FIGS. 4-6C.

The energy collection node 120 includes an auxiliary energy converter 130 connected to a coupling 132. The auxiliary energy converter 130 and coupling 132 can be used to position the energy collection node 120 for improved solar energy collection (e.g., turn and/or tilt solar panels to face the sun). In some implementations, the auxiliary energy converter can operate by drawing energy previously stored in the capacitor 124. For example, the DC buss manager 122 can route power from the capacitor 124 to the auxiliary energy converter 130 for positioning the energy collection node 120. In some implementations, the auxiliary energy converter 130 can operate by drawing energy from the single phase AC buss 114. For example, AC power can be stepped down by a transformer 134 and rectified to DC power by a rectifier 136, and routed by the DC buss manager 122, for example, to the auxiliary energy converter 130.

In some examples, the auxiliary energy converter 130 can draw power from the DC buss manager 122 and/or through the transformer 134 and rectifier 136 during a startup or a period of low energy collection. For example, the coupling 132 can be configured to orient the energy collection node 120 to track the position of the sun. At sunset, the energy collection node 120 can be facing substantially west when the sun's energy becomes unavailable for collection. When the sun rises in the east, the energy collection node 120 can be facing the wrong way to collect enough energy to operate the auxiliary energy converter 130 and the coupling 132. The auxiliary energy converter 130 can temporarily draw power from the capacitor 124 to turn the energy collection node 120 to face the sun and resume the collection of solar energy. In another example, the auxiliary energy converter 130 can draw power from the capacitor 124 to reposition the energy collection node 120 during or after a period of low-energy collection, such as a heavily overcast morning or a solar eclipse. In some implementations, the positioning system 132 can be operated by the control module 108. In one embodiment, the control module may be programmed to maintain a reserve of energy sufficient to proactively orient the position of the ECN 120 during periods of low collection so as to be prepared to resume energy collection, for example.

In some implementations, the auxiliary energy converter 130 can generate DC power that can be managed by the DC buss manager 122. For example, the auxiliary energy converter 130 may include an electric motor with regenerative braking, wherein the energy converter 130 may, for example, dynamically brake a hydroelectric turbine to maintain an optimal output power from the ECN 120 to the DC Buss Manager 122, including converting excess energy to electrical energy for storage. In another example, the energy converter 130 may drive a controlled movement of the energy collection node 120, and recover the kinetic energy while bringing the node 120 to a stop. In another example, the auxiliary energy converter 130 may include a hydraulic or pneumatic actuator configured to pressurize a positioning mechanism (e.g., the coupling 132), and/or to convert excess power from the ECN 120 to stored energy via the coupling 132.

Figure 2:
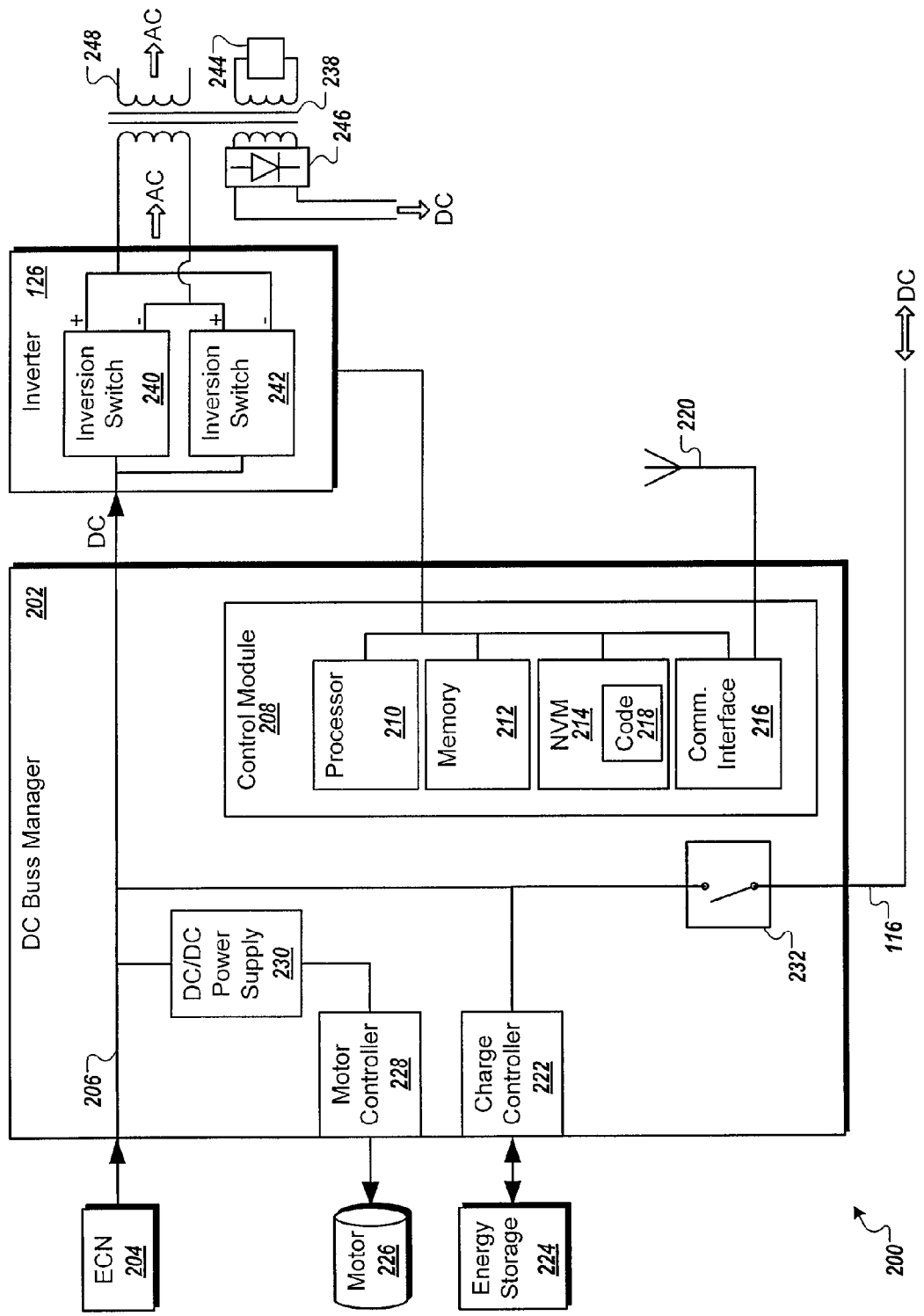
FIG. 2 shows an example single phase generation module (1PGM).

FIG. 2 shows an example 1PGM 200. The 1PGM 200 includes a DC buss manager 202. The DC buss manager 202 control the routing and stabilization of DC power generated by an energy collection node 204 and output to a DC buss 206. In some implementations, the energy collection node 204 can generate DC power from various sources. For example, the energy collection node 204 can include a windmill, a tidal generator, a geothermal generator, a hydroelectric generator, or other devices that can produce AC and/or DC power. As can be appreciated from the rectification and capacitive storage that may, at least in some examples, be provided across the inputs of the inverter 126, the voltage signal that the DC buss manager supplies to the inverter 126 may be in AC, DC, or other non-linear or linear waveform.

The DC buss manager 202 includes a control module 208. The control module 208 includes a processor module 210. The processor module 210 can perform various functions, such as management, user interface, signal processing, and/or power management operations. For example, the processor module 210 can supervise various operations, such as monitoring power levels, and routing power for stabilization of the DC buss 206.

In the depicted example, the processor module 210 is coupled through a digital bus to memory devices, including a memory 212, a non-volatile memory (NVM) 214, and a communications interface 216. The memory 212 may provide temporary storage for monitored buss power levels. The memory 212 may include, for example, RAM, a buffer, or cache memory, for volatile data storage. In some implementations, the processor module 210 may quickly access the memory 212 to retrieve and/or store data. The NVM 214 may provide a storage space for storing data (e.g., monitored DC buss power levels) and/or executable instructions (e.g., application software). The NVM 214 may include, for example, flash memory, read only memory (ROM), EEPROM, data storage devices with rotating media (e.g., optical or magnetic disc drive), tape storage devices, or any combination of these or other data sources.

In this example, the NVM 214 is coupled to the processor module 210 by a digital address/data bus. The processor module 210 may execute instructions and retrieve information stored in the NVM 214 via the bus. For example, the NVM 214 includes a code module 218 containing instructions that, when executed by the processor module 210 can cause the processor module 210 to perform operations to manage power levels on the DC buss 206. The NVM 145 may include a number of other code modules (not shown) to perform other operations, including operations in support of basic DC buss management operations (e.g., user interface, boot-up, configurations). For example, one code module may compute an energy storage rate, or its substantial equivalent, based on information about the power generated by the ECN 204 and measurements of current flow through the DC buss 206. The power information may be received, for example, by direct measurement, user input, and/or other communication methods.

In the control module 208, the digital bus is further coupled to a communication interface module 216. The communication interface module 216 communicates with other DC buss managers 202, the ECN 204, and/or a control module (e.g., the control module 108 of FIG. 1). The communication interface module 216 can send and/or receive data to monitor or manage DC buss 206 from a node remotely connected to the DC buss manager 202 by a wired and/or wireless network. For example, the communication interface module 216 can be configured to communicate wirelessly through an antenna 220 to a cellular, WiFi, WiMax, Bluetooth, and/or other wireless communications network. In other examples, the communication interface module 216 can be configured to communicate using Ethernet or other data networking format, power line communications, USB, RS232, FireWire, and/or other data communications formats.

The DC buss manager 202 includes a charge controller module 222. The charge controller module 222 can charge and/or discharge an energy storage module 224. For example, during periods of high power output by the ECN 204, the charge controller module 222 can use power from the DC buss 206 to charge the energy storage module 224. During periods of low power output, the charge controller module 222 can use power from the energy storage module 224 to boost the power level of the DC buss 206. In some implementations, the energy storage module 224 can include one or more capacitors, batteries, flywheels, heat storage vessels, or other electrical, chemical, kinetic, potential, or other forms of energy storage.

The DC buss manager 202 can provide power to a motor 226 through a motor controller 228. In some implementations, the motor 226 can include the auxiliary energy converter 130 of FIG. 1. For example, the motor controller 228 can power the motor 226 to orient the ECN 204 for improved energy collection. In some implementations, a DC/DC power supply 230 can convert DC power at the DC buss' 206 power levels to DC power that is usable by the motor controller 228 and motor 226. For example, the DC buss 206 can operate at 200VDC to 600VDC, and the DC/DC power supply 230 can convert the DC buss 206 power to 24VDC for use by the motor 226.

The DC buss manager 202 includes a switch 232 that can connect the DC buss 206 to a DC inter-tie buss 116. In some implementations, the DC inter-tie buss can be the DC inter-tie buss 116 of FIG. 1. The DC inter-tie buss 116 conducts DC power bidirectionally among 1PGMs in a 1PGM inter-tie group such as the 1PGM inter-tie group 118.

The 1PGM 200 also includes an inverter module 126 and a transformer 238. The inverter module 126 converts DC power from the DC buss 206 to AC power. The inverter module 126 includes an inversion switch 240 and an inversion switch 242. In some implementations, the inversion switch 240 can form one half of an AC waveform (e.g., the positive half), and the inversion switch 242 can form the other half (e.g., the negative half), so when combined, the inversion switches' 240-242 outputs can be combined to form a substantially sinusoidal waveform. Examples of the inverter module 126 are discussed in the description of FIG. 3A.

The transformer 238 transforms AC power from the levels produced by the inverter module 126 to levels that can be transmitted on a single phase AC buss (e.g., the single phase AC buss 114 of FIG. 1), transmitted to a power utility, and/or transmitted to a power grid. The transformer includes a harmonic suppression module 244 and a rectifier 246. The harmonic suppression module 244 suppresses 3rd, 5th, and/or higher order harmonics that can be present in the AC power produced by the inverter module 126. For example, the harmonic suppression 244 can suppress harmonic elements to reduce the THD present at a secondary winding 248 of the transformer 238 to satisfy a power utilities' requirements for contributing power to a power grid. Examples of the transformer 238 are discussed in further detail with reference to FIGS. 4-6.

In some implementations, the harmonic suppression module 244 can include passive components (e.g., inductors, resistors, capacitors).

In some other implementations, active components may be used to suppress harmonic signal elements. For example, an actively controlled amplifier may use digital techniques to create a current signal that comprises one or more harmonics, each harmonic current being phase shifted to actively and substantially offset the harmonic flux at the secondary winding 248 generated by the corresponding primary winding harmonic current. In such examples, the actively generated harmonic suppression currents may be driven simultaneously on a single winding, which may be concentrically wound with the secondary output winding 248. In other examples, the actively driven harmonic currents may be separated onto two or more harmonic suppression windings.

In some implementations, the 1PGM 200 can use utility power, for example, during periods of low output by the ECN 204. For example, the ECN 204 may be out of alignment and need to be repositioned by the motor 226, and the energy storage module 224 may be depleted. Utility power at the secondary winding 248 can be transformed by the transformer 238 and rectified by the rectifier 246 to provide DC power to the DC buss manager 202. The DC buss manager 202 can route the transformed utility power to operate the motor 226, to charge the ECN 224, and/or operate the control module 208.

Figure 3A:
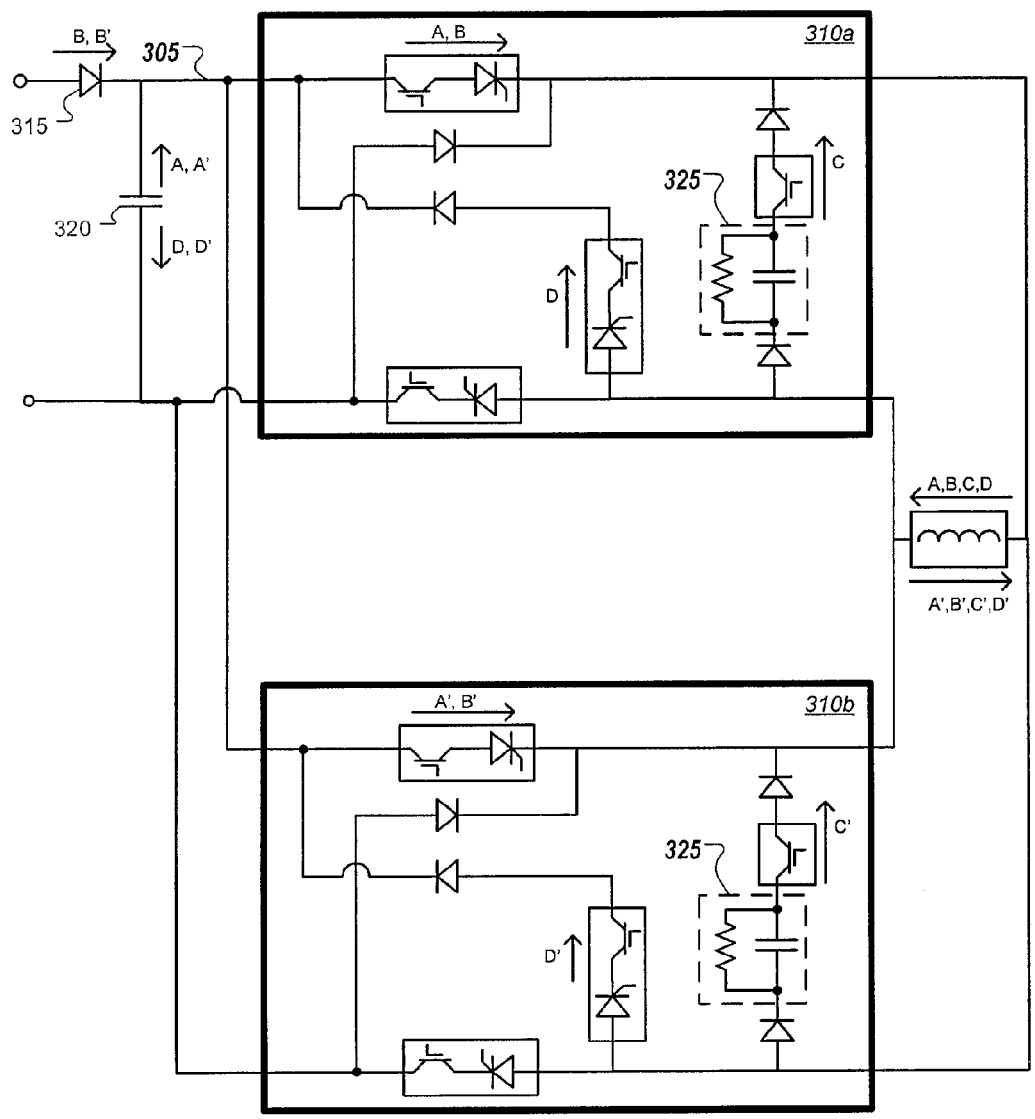
FIG. 3A shows a schematic representation of an exemplary pair of power stages to supply energy from a DC input to an AC inductive load.
Figure 3B:
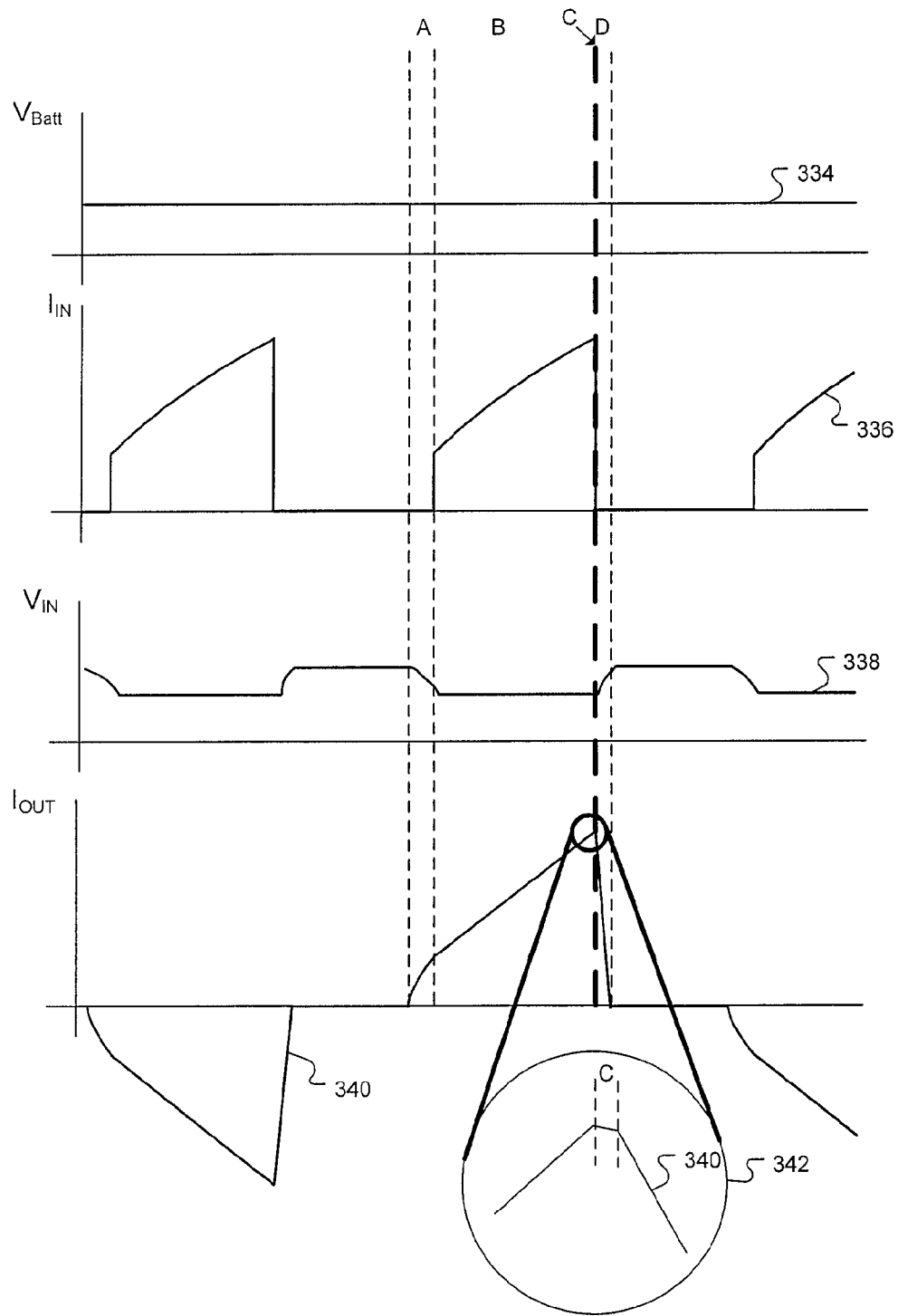
FIGS. 3B-3C shows plots of exemplary voltage and current waveforms to illustrate operation of the power stages of FIG. 3A.

FIGS. 3A-3B illustrate an exemplary inverter and electrical waveforms capable of operating to produce the low THD AC output power with high efficiency, as described in various embodiments herein. Examples of an inverter and its operation are described in further detail in U.S. patent Ser. No. 11/582,115, entitled "Supply Architecture for Inductive Loads," as filed on Oct. 16, 2006 by Babcock et al., the entire contents of which are fully incorporated by reference herein.

FIG. 3A shows a schematic representation of an exemplary pair of power stages 310a, 310b to supply energy from a DC input to an AC inductive load. In some implementations, the pair of power stages 510a, 510b can form the inverter module 126 of FIG. 1. In this implementation, the power stages 310a, 310b are substantially similar in that they have substantially the same circuitry and draw power from the same power source (e.g., through the diode 315). They differ primarily in the timing of their output signals. In various implementations, the power stages 310a, 310b may alternately supply output current to the load. In particular, the power stage 310a may supply unidirectional output current A, B, C, D in a first direction to the load, and the power stage 310b may supply unidirectional output current A', B', C', D' in a second direction to the load. In some implementations, a capacitor 320 may be implemented using two or more parallel capacitances that may provide wider response bandwidth (e.g., low inductance paths) and/or increased capacitance.

In an illustrative implementation, a controller (e.g., the control module 108 of FIG. 1) may generate control signals to perform an operating cycle using power stage 310a. During power stage 310a's operating cycle the controller may turn off all of the switches in the power stage 310b, and thereby prevent any output current from the stage 310a from flowing in the stage 310b. Similarly, the controller may disable the stage 310a when the power stage 310b performs its operating cycle.

The inverter controller may synchronize the inverter switching to substantially line frequency and phase by triggering the inverter half-cycles in response to key points (e.g., peaks, zero crossings) in the waveform of the utility grid. In some other examples, the controller may synchronize to a command timing signal (e.g., via RF, land-line, satellite) supplied by the utility. In some implementations, phasing may be advanced or retarded to compensate for local phase conditions, which may be substantially remote from a utility generation site, or even due to phase differences associated with location within the facility 100 of FIG. 1.

Voltage regulation may be controlled, as described, to output a slightly higher voltage than the utility so that power flows out of the facility onto the utility grid. By monitoring voltage and current flows through the utility interface 104 and AC Busses 106, the amount of power delivered to the utility grid may be monitored and controlled by appropriate adjustment of phase (e.g., timing) and voltage (e.g., pulse-width) from the 1PGMs.

Figure 3C:
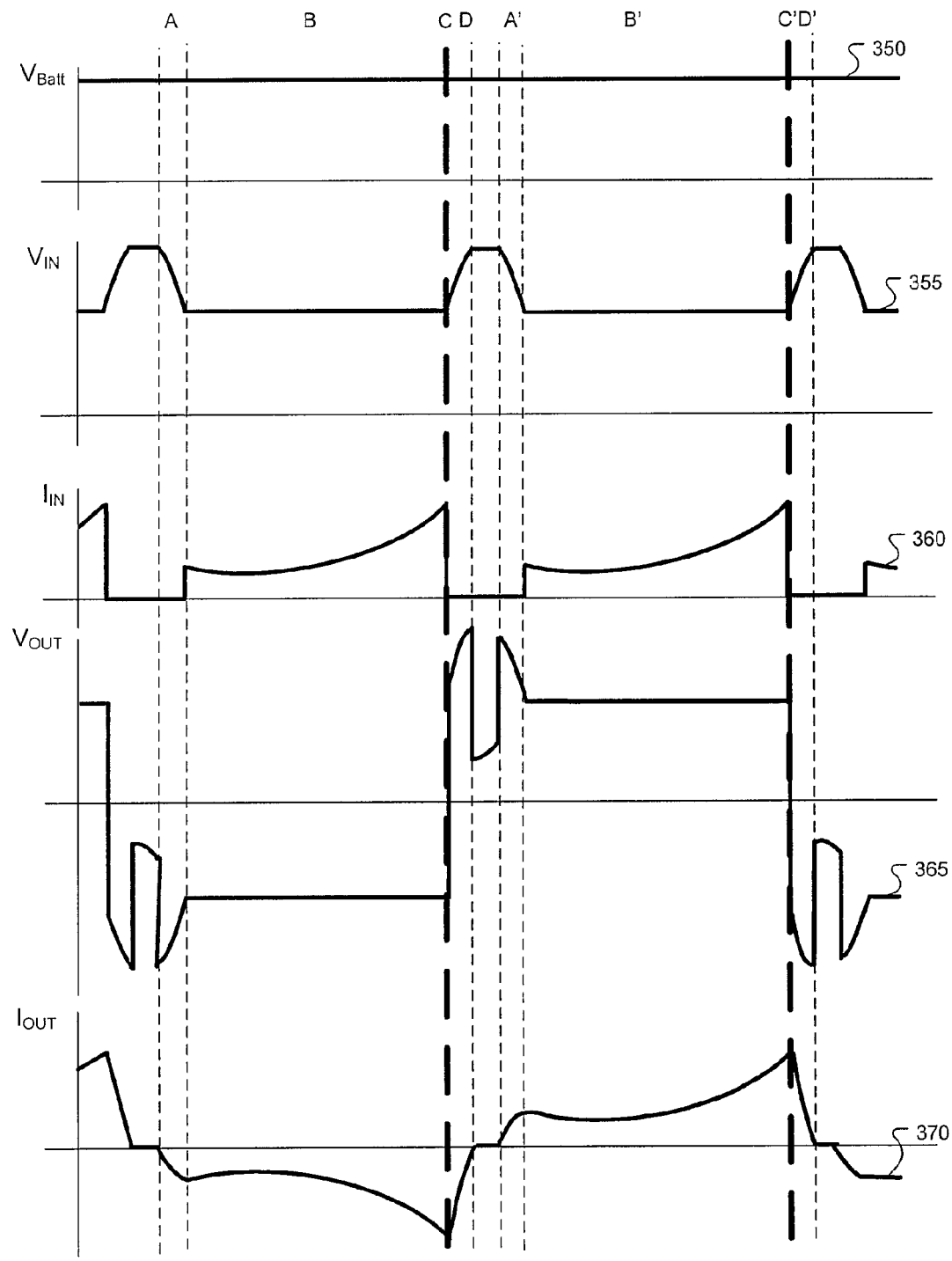

FIGS. 3B-3C show plots of exemplary voltage and current waveforms to illustrate operation of the power stages of the inverter 126, including an exemplary illustration of primary current waveform construction to reduce harmonic content.

In the example depicted in FIG. 3B, a plot 334 illustrates that the DC buss manager 122 provides a unipolar input voltage. In this case, the voltage may be that supplied by the ECN 120. In other examples, the DC buss manager 122 may be any other suitable unipolar or DC source, such as a half- or full-wave rectified AC signal, for example. In some applications, the DC buss manager 122 may exhibit a voltage stiff characteristic, which may be provided, for example, by a substantially large hold-up capacitor such as the capacitor 124. In some other applications, the power source may provide a rectified AC signal (e.g., from a turbine-style electrical generator driven by geothermal, wind, or hydrokinetic energy) without a substantial hold-up capacitance.

The plot 336 illustrates that the DC buss manager 122 supplies the input current Iin to the primary winding during the time period B (e.g., Iin=Iout), and not during any other time period of the exemplary operating cycle.

The plot 338 illustrates that Vin at an input node 305 is elevated at the beginning of the time period A, which reflects the charge on the capacitor 320.

The plot 340 of the output current Iout, which can represent the constructed transformer primary winding current, illustrates that the discharge of the capacitor 320 during the time period A supplies real energy to the load, which may advantageously reduce the power drawn from the DC buss manager 122 during the operating cycle.

The plots 338, 340 also show the charging of the capacitor 320 and a controlled decrease in output current Iout in the time period D. The controlled decrease of Iout may advantageously control an amplitude of the reverse electromotive force (REMF).

The plot 342 illustrates, in a magnified view, a portion of the output current Iout waveform around the time period C in the plot 340. In some examples, the time period C is short relative to the time periods A, B, and D. During the time period C in this example, the slope (e.g., dIout/dt) of the plot 340 is controlled substantially by operation of a voltage limiter 325. In some embodiments, the slope may be controlled sufficiently well such that the amplitude and noise energy associated with the REMF voltage signal may be substantially reduced.

In some applications, successive operating cycles may occur without interruption for an indefinite period during which energy may be supplied to the load. For example, operating cycles may have a substantially fixed period, which may include, but is not limited to, periods of between about 10 and about 20 milliseconds, or between about 1 and about 30 milliseconds, or between about 50 and about 1000 microseconds, or less than 60 microseconds, for example. In some applications, one or more finite number of successive periods may be interrupted by variable times of not supplying power to a load. In some embodiments, the duration of an operating cycle may be varied according to load requirements, an input command, or other requirements (e.g., to avoid an audible resonance frequency, filtering requirements, synchronization to a utility supplied voltage).

For purposes of further illustration, FIG. 3C includes exemplary plots 350, 355, 360, 365, and 370 show bi-directional current at the load, as described, for example, with reference to FIG. 3A. In addition, the load in the depicted example includes an AC motor. As such, the waveforms in the plots of FIG. 3C reflect a time-varying back-EMF generated by the motor.

Although the output current Iout of the plot 370 is bidirectional and supplied to an AC motor, the inverter module 126 of FIG. 1 provides for a controlled dIout/dt during time periods C, D, C' and D'. As such, the REMF voltage may be well controlled, providing various advantages as discussed above. Moreover, the energy captured during the time periods D, D' may be reused during subsequent time periods A, A', respectively.

Figure 4:
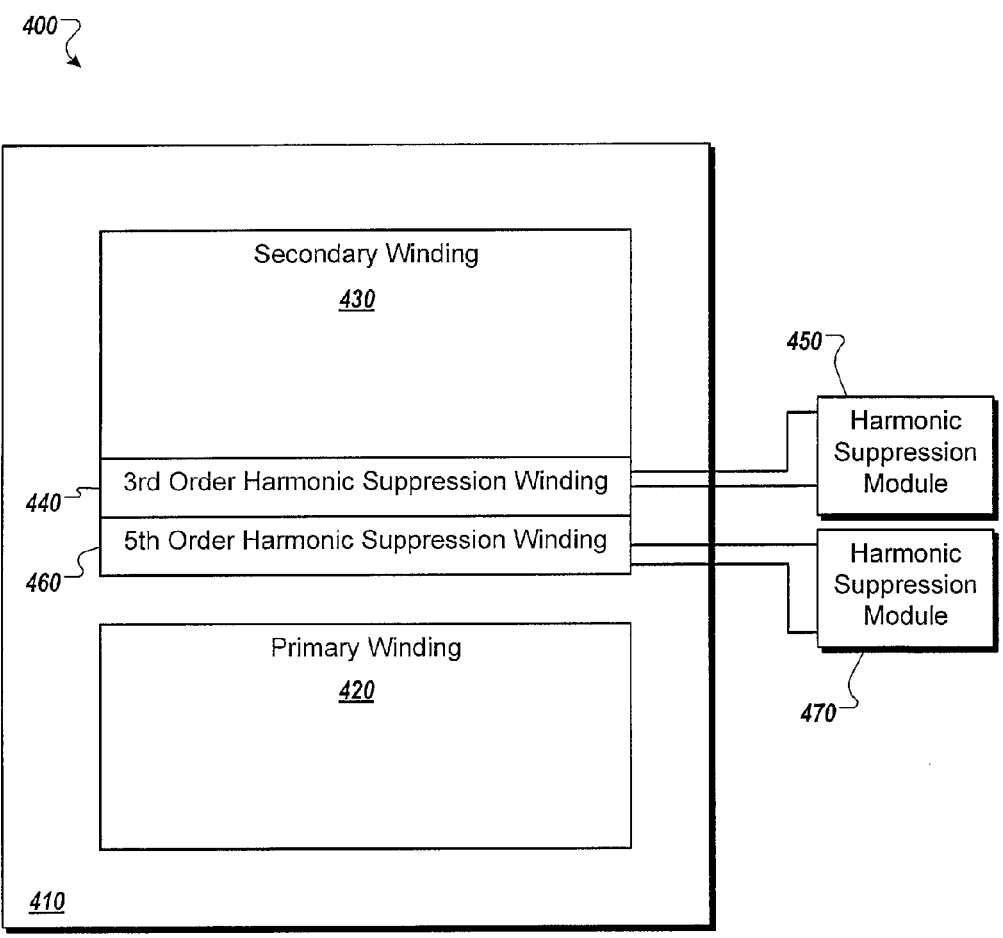
FIG. 4 shows an example harmonic-suppressing transformer.

FIG. 4 shows an example transformer 400 that includes windings for suppressing harmonics. The transformer 400 includes a magnetic core 410, a primary winding 420, and a secondary winding 430. In some implementations, the primary winding 420 can be connected to the AC output of an inverter module, such as the inverter module 126 of FIG. 1, and the secondary winding can be connected to a single phase AC buss, such as the single phase AC buss 114. The transformer 400 transforms power from levels provided by the inverter module to levels that can be transmitted on the single phase AC buss. In one example, a 1 kW inverter module may receive 300 VDC and output 208VAC at about 4.8 A.

The secondary winding includes a third order harmonic suppression winding 440 and a harmonic suppression module 450. When properly tuned, the third order suppression winding and the harmonic suppression module 450 form a circuit that substantially cancels third order harmonic signals that would otherwise be propagated from the incoming AC power at the primary winding 420 to the AC output voltage signal on the secondary winding 430. In the depicted example, the transformer 400 includes a third harmonic suppression winding 440 coupled to a harmonic suppression module 450, and a fifth harmonic suppression windings 460 coupled to a harmonic suppression module 470, each tuned to suppress a higher order harmonic. In some implementations, one or more additional (e.g., seventh, eleventh) higher order harmonic suppression windings and modules can be provided and tuned to suppress selected higher order harmonics. Accordingly, harmonic frequencies can be suppressed to attenuate selected harmonics and thereby reduce the THD of the AC output signal on the secondary winding 430.

In some implementations, the transformer 400 can be a high impedance transformer, which may advantageously limit fault current from the utility grid in the event of a fault through the transformer. In some implementations, the transformer 400 can be used with other components such as the DC buss manager 122 and/or the inverter module 126 to convert DC power to AC power at high efficiency levels (e.g., 97% or higher). In some implementations, the transformer 400 can provide substantial electrical isolation between a 1PGM and the utility electrical grid. In some implementations, the transformer 400 can be constructed with polyphase windings, including, but not limited to, 2, 3, 4, 5, 6, 7, 8, 9, 10, 12, 15, 18, 20, 24 phase windings, which may be wound on a common or independent cores, to provide a polyphase AC signal (e.g., WYE, Delta, with or without neutral connection, or the like).

Figure 5A:
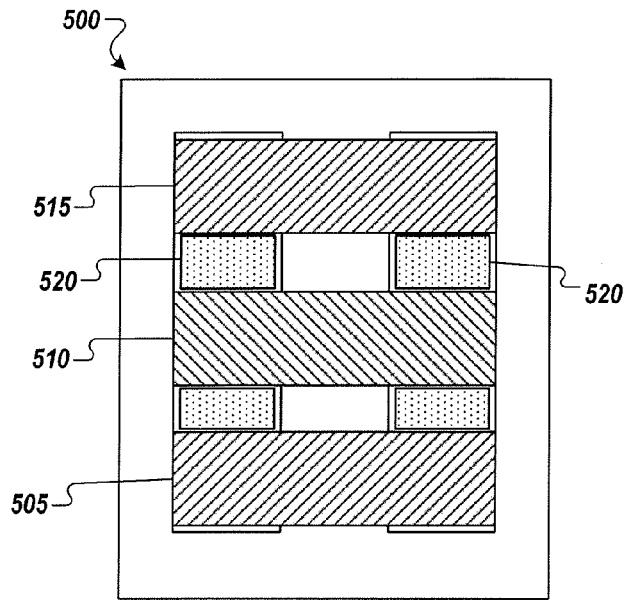
FIGS. 5A-6C illustrate exemplary configurations and describe experimental results.

FIGS. 5A-5D illustrate the configuration and output of an example transformer 500 used in an example experimental test setup. A side view of the transformer 500 is illustrated in FIG. 5A. The experimental transformer set-up was rated to operate at approximately 160 VDC input, 121 VAC output, and between about 96 W and 160 W.

The transformer 500 was wound to operate from DC voltages by an AC voltage to DC voltage ratio that may substantially compensate for the reduced impedance effects produced by an inverter module. In one example, a factor of 1.2 multiplied by the DC supply voltage of 160VDC resulted in a 192VAC design voltage. By winding the transformer's 500 primary 505 for 192VAC operation, the transformer was configured to operate at 160VDC with the inverter module.

The transformer was designed with a 1:1 input to output ratio for testing DC to AC power equivalency. Special attention was also given to the harmonic suppression module to get improved performance with practical component values. One objective of the experiment was to determine if the harmonic suppression features of the transformer could produce AC power at THD levels of 5% or less.

A prototype transformer design was created with concentrically wound harmonic suppression windings for 3rd and 5th harmonic control on the primary 505 and secondary 510 portions of the transformer 500. A third set of windings 515 were added to the transformer 500 with a magnetic shunt 520 as another option for testing harmonic control and other options.

Experiments were run to determine suitable harmonic winding capacitance values. A variety of low cost, non-polarized capacitors were obtained for this purpose. A capacitor, acting as the harmonic suppression module, was connected to the third harmonic winding on the secondary 510 side and power was set to 70%. Results were observed as capacitance was added to the circuit. By connecting capacitors to the third harmonic winding of the secondary 210 side, flyback capture energy was not significantly affected. As the 180 Hz tuning point was approached, the current peaks pulled substantially to the center of the half-cycles and sinusoidal rounding was evident. The primary current was tuned to produce less than 10% THD. The oscilloscope measurements showed that the output voltage from the secondary winding 510 was a substantial sine wave with about 6% THD. Further fine-tuning of the capacitor bank reduced THD to 3.8%.

The inverter module was the set up to operate at 120VDC on a 200 Ohm load. DC input, AC output voltage and current, harmonic winding current, voltage and power measurements were taken to calculate the 1PGM's IsqR losses from winding resistances. IsqR losses were then subtracted from total power to calculate hysteresis loss and power transfer efficiencies. The results were as follows:

DC Input Power=800 mA mean×120VDC=96 Watts

Switch Loss at 120VDC=6%=5.76 Watts

Primary Winding Loss=1.12 A RMS squared×4.2 Ohms=5.26 Watts

Secondary Winding Loss=0.616 A RMS squared×4.2 Ohms=1.8 Watts

Harmonic Winding Loss=2.88 A RMS squared×0.8 Ohms=6.6 Watts

Harmonic capacitor loss (measured with power analyzer)=1.3 Watts

Total switch and IsqR losses=20.71 Watts

96 Watts input power−20.71 Watts IsqR losses=75.29 Watts

Transformer Output Watts=121VAC RMS×0.616 A RMS=74.54 Watts 74.54 Output Watts/75.29×100=Transformer efficiency with no IsqR losses=99%

This experiment suggests that the 1PGM can operate at 99% efficiency and a 1% or lower transformer core loss.

Another round of testing was done to explore the pulse width to VAC transformer output regulation range, or in other words, to determine how much output VAC voltage level control the experimental system has while keeping the total VAC output THD under 5%. The transformer's 500 primary 505 current and the transformer's 500 output voltage where monitored as the DC input power level was pulse width modulated in an effort to determine the smallest amount of electrical energy that can be applied while still maintaining satisfactory noise levels at reduced transformer output voltages.

The regulation range of the inverter module was observed to be between 104VAC and 126VAC; a range of 22V RMS. Through most of the regulation range the transformer output remained below 4% THD. This form of PWM power regulation appears to be substantially nearly lossless. No significant electrical power was found to be lost to regulation.

Further experimentation was carried out to observe how the experimental system handled warped and unusual loads. The oscilloscope was synchronized with the utility power supplied to the building to perform a power comparison test of the 1PGM versus the utility. The resulting observations indicated that the 1PGM AC output power had a THD level of 2.7% compared to 4.3% for the utility.

For example, experimentation was performed to observe the behavior of the experimental system under large inductive loads. A 20 mH choke was wired in series with the 200 Ohm load, and the experimental system operated with no observed problems. The choke appeared to add approximately 7 Ohms of impedance to the output circuit, and dropped a small amount of voltage. The 20 mH inductive load was then replaced by a 400 mH inductive load, and the resulting output voltage was boosted to over 300VAC with a low, distorted current. The same real power level was observed, and the 1PGM handled the load without damage.

The inverter frequency and phase timing may be based on a synchronization signal, alone or as adjusted by an adjustable phase delay. Based on experimental observations, adjustment of the phasing control showed +90 degree to −90 degree phasing locked on to the utility's power signal, and the performance was substantially transient free.

In one exemplary embodiment, a synchronization signal at twice utility line frequency (e.g., 100, 120 Hz) may be derived, for example, from the peaks and/or zero-crossing points of line voltage. In some examples, the synchronization signal may take the form, for example, of a 120 Hz pulse stream. In some examples, the inverter may be synchronized to the utility grid voltage with two full cycles of delay, as determined by a delay timer. For example, the delay may be two periods (e.g., about 33.33 millisec) behind a utility synchronization signal. The delayed 120 hz sync signal may drive the 60 Hz inverter switching process. In an illustrative example, applying about 33.33 msec delay may cause the inverter primary current to be substantially aligned in phase with the zero crossing of the utility voltage. If the timer delay is decreased by 4.15 msec, then the primary current will start about 90 deg ahead of the utility voltage. If the timer delay is increased 4.15 msec, then the primary current will start about 90 degrees behind the utility voltage. As such, phase control can controllably adjusted smoothly (e.g., substantially without transients) and continuously over a wide range to accurately and inexpensively match the phase of the supplied power to the phase of the utility line voltage with precision at the location where the power flows combine (e.g., the utility interface 104).

Based on experimental observations, inverter operation could be shut down in up to about one half cycle after an event (e.g., loss of synchronization pulse), and substantially no transients were generated as a result of the shutdown.

It is believed that the rapid-shutdown of the inverter does not cause transient phenomenon, at least in part, because the inverter recaptures magnetic energy stored in the primary winding each half-cycle. This recapture process is believed to return the transformer core to a substantially de-energized state. Accordingly, it is believed that recapture of the described energy substantially reduces or eliminates opportunities for magnetic energy within the transformer core to produce uncontrolled transient energy (e.g., voltage spikes) when the inverter is forced to suddenly shut down.

Figure 5B:
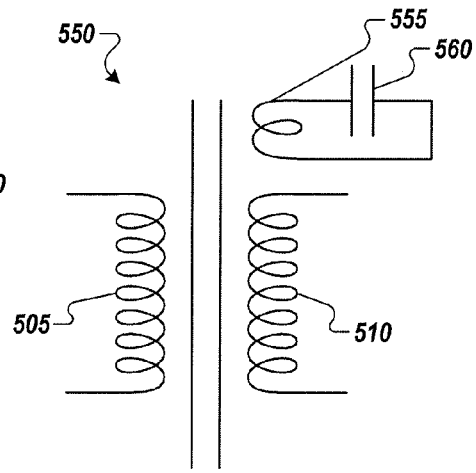

FIG. 5B illustrates one experimental configuration 550 of the transformer 500. The third harmonic suppression winding 555 and 250 uF capacitor 560 were used.

Figure 5C:
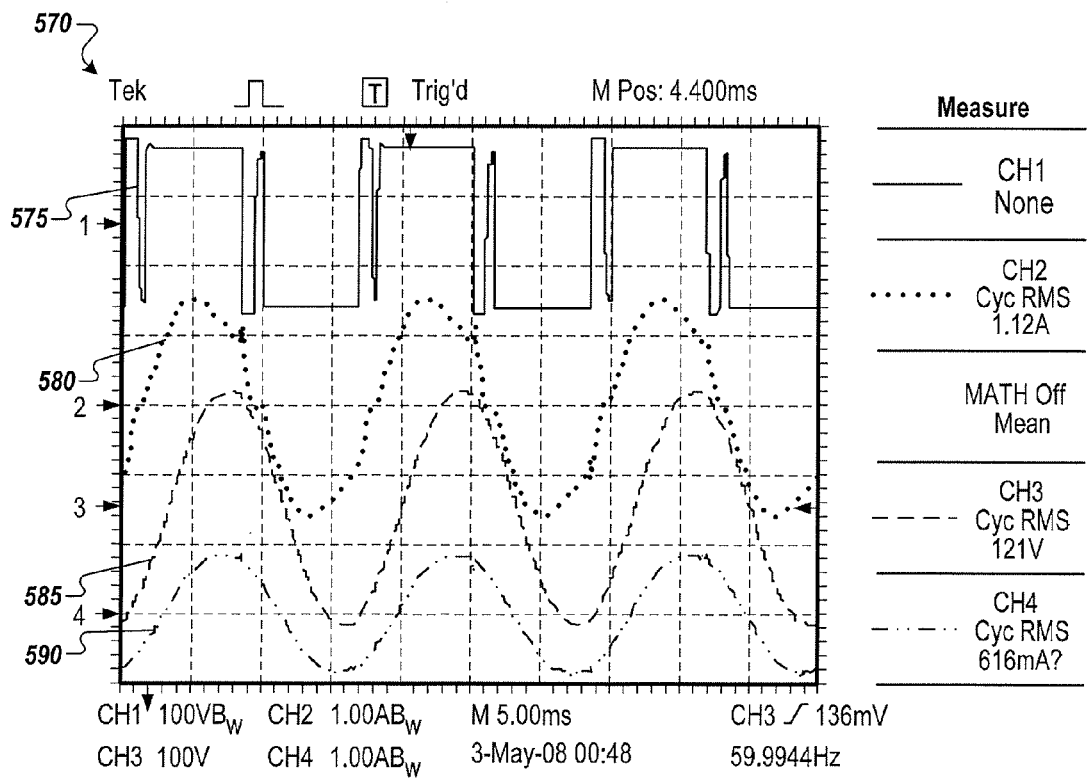

FIG. 5C shows an example oscilloscope screen shot 570 that displays several example waveforms 575-590 that were observed during the experiment. The waveform 575 displays the transformer primary 505 input voltage waveform. The waveform 580 shows the transformer primary 505 input current waveform. The waveform 585 shows the transformer secondary 510 output voltage waveform, and the waveform

590 shows the transformer secondary 510 output current waveform. The waveform 575 shows that the inverter module can capture flyback energy to produce a bidirectional DC voltage waveform with a nearly sinusoidal current waveform 580 with substantially attenuated losses (e.g., core losses, switching losses) other than IsqR losses. The waveform 580 is a constructed waveform that is created by the electrical switching process of the 1PGM and the exploitation of stored transformer 500 core energy that might otherwise be lost to hysteresis and/or transformer core heating.

In this experiment, the system used waveform construction (without harmonic suppression winding) to create an alternating primary current waveform 580 that is within about 20% of a pure sine wave, and with a good harmonic profile. By adding one harmonic suppression winding on the secondary side 510 of the transformer 500 tuned to position the phase of the 180 Hz third harmonic so as to substantially oppose the third harmonic flux associated with the primary winding, the transformer 500 produced a secondary winding output voltage signal with substantially reduced third harmonic content. The experimental secondary winding power output is shown by the secondary voltage waveform 585 and the secondary current waveform 590. The wave shaping also affected the primary current waveform 580, which exhibited THD reduction from 20% THD down to 7.5% THD.

The % THD for the output voltages were experimentally determined under various pulse widths, as shown in FIG. 5D. Table 592 shows example experimental % THD values for the output voltage measured at various switch pulse widths to assess the relationship between pulse width applied by the inverter 126 and output voltage regulation on the secondary winding 510 of the transformer 550. In this experiment, the inverter system was configured to output a 120VDC pulse width modulated signal with a 200 ohm load through the transformer's primary winding. The transformer's output voltage and % THD were measured as the pulse width modulation was varied.

The table 592 displays a representative sampling of the results where transformer output % THD is 5% or less. As the table 592 shows, in the experimental configuration, the regulation range of the inverter was approximately 104VAC to 126VAC, or a range of 22V RMS. Through most of this range, % THD remained substantially below 5%. For example, an output of 2.52% THD at 120VAC was measured with an applied pulse width of 78%.

Figure 6A:
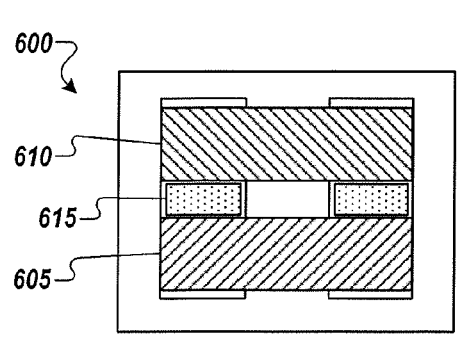
Figure 6B:
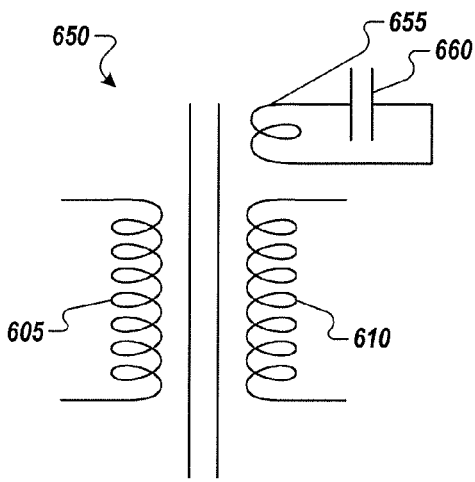
Figure 6C:
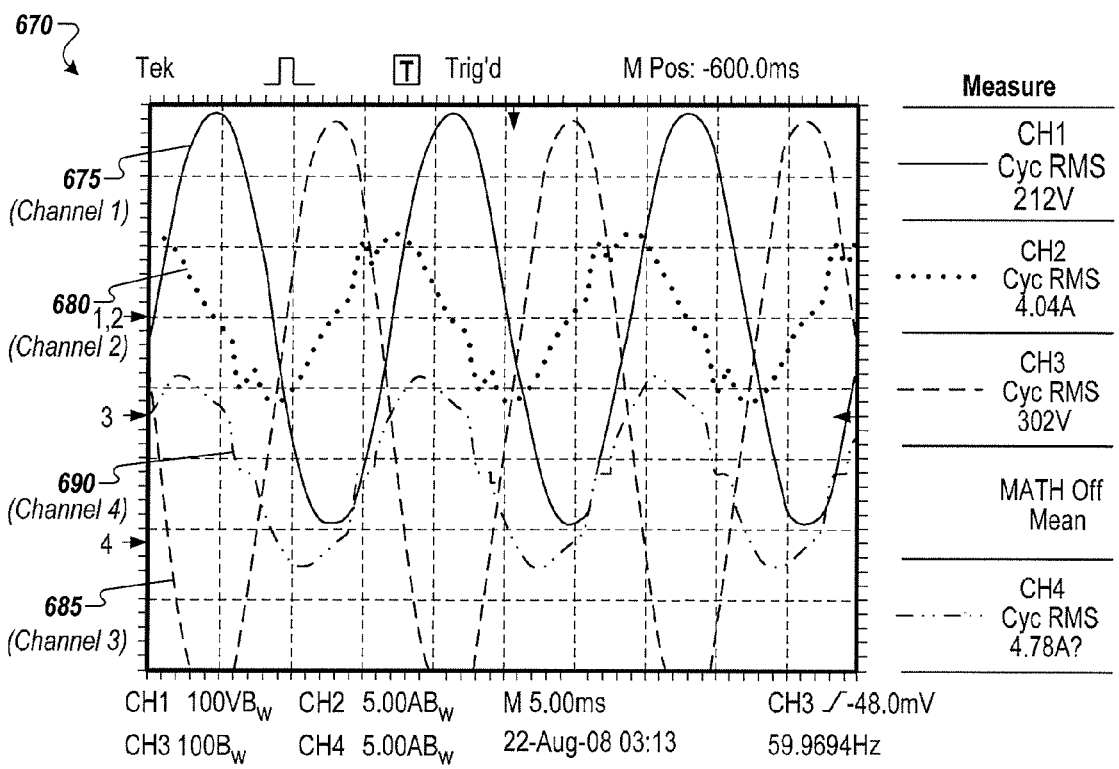

FIGS. 6A-6C illustrate the configuration and output of an example transformer 600 used in a second experimental test setup. A side view of the transformer 600 is shown in FIG. 6A. The transformer 600 of this experiment was constructed with a primary winding 605 and a secondary winding 610 in a 1:1 turns ratio for a 300 VAC output. A shunt 615 separates the windings 605. The shunt 615 can be adjusted to meet the needs of various implementations. For example, flyback energy capture may be increased by adjusting the shunt to increase primary leakage inductance, which may be recaptured by the inversion switches 240, 242. In some embodiments, the primary leakage inductance of the primary winding 505 may provide adequate flyback energy capture to perform waveform construction that meet a system's THD specifications. In other embodiments, supplemental inductance may be provided in series with the primary winding so that sufficient flyback energy may be recaptured to perform waveform construction that meets a system's THD specifications.

FIG. 6B illustrates an experimental configuration 650 of the transformer 600. The configuration 650 includes the primary winding 605 and the secondary winding 610 in a 1:1 turns ratio. In the experimental prototype, a harmonic suppression winding 655 is concentrically wound with the secondary winding 610. A capacitor 660 is connected in parallel with the harmonic suppression winding 655.

In the configuration 650, the value of the capacitor 660 was experimentally adjusted to cause approximately 60 degree leading phase shift between the fundamental currents in the primary winding 605 and the harmonic suppression winding 655. In some implementations, this phase shift is believed to shift the phase of the 3rd harmonic current waveform on the harmonic suppression winding to be out of phase with the 3rd harmonic current in the primary winding 605. In this experiment, the value of the capacitor 660 to achieve substantial reduction in third harmonic voltage on the secondary winding 610 was found to be around 50 uF. Capacitance values may be selected, for example, by adjusting circuit parameters (e.g., turns, inductance, capacitance) of the suppression winding 655 to substantially control the relative phase of the third harmonic voltages on the windings 605, 655. This achieves an output voltage with a substantially attenuated 3rd harmonic component. In another example, the capacitance value may be selected to produce a phase shift between the fundamental currents on the primary winding 605 and a harmonic suppression winding, such as the winding 655, so that the kth harmonic currents in those windings produce substantially offsetting kth harmonic flux that couples to the secondary winding 610.

FIG. 6C shows an example oscilloscope screen shot 670 that displays several example waveforms 675-690 that were observed during the experiment. The waveform 675, 680 show voltage and current, respectively, of the harmonic suppression winding 655. The waveform 685 shows the voltage observed at the secondary winding 610 of the transformer 600 under full load (e.g., 300VDC, 1 KW, 90 ohm load). The waveform 690 displays current, as constructed by the inverter using recaptured flyback energy, in the primary winding 605. The % THD was measured to be 2.2% on the output voltage waveform 685.

Note that waveforms 675, 680 indicate that the fundamental voltage and current of the harmonic suppression winding 655 appear to be substantially 90 degrees out of phase, indicating that the power loss at the fundamental frequency in the harmonic suppression winding 665 appears to include primarily resistive losses.

In experiments during operation with an inverter, such as an example embodiment of the inverter 126, the transformer 600 response was substantially flat (e.g., well regulated and stable) over a range of 50% to 100% resistive load (no data was taken below 50% load) and controllable with pulse width modulation. The transformer 600 was observed to have substantially no problems delivering full power at continuous duty operation.

Figure 7:
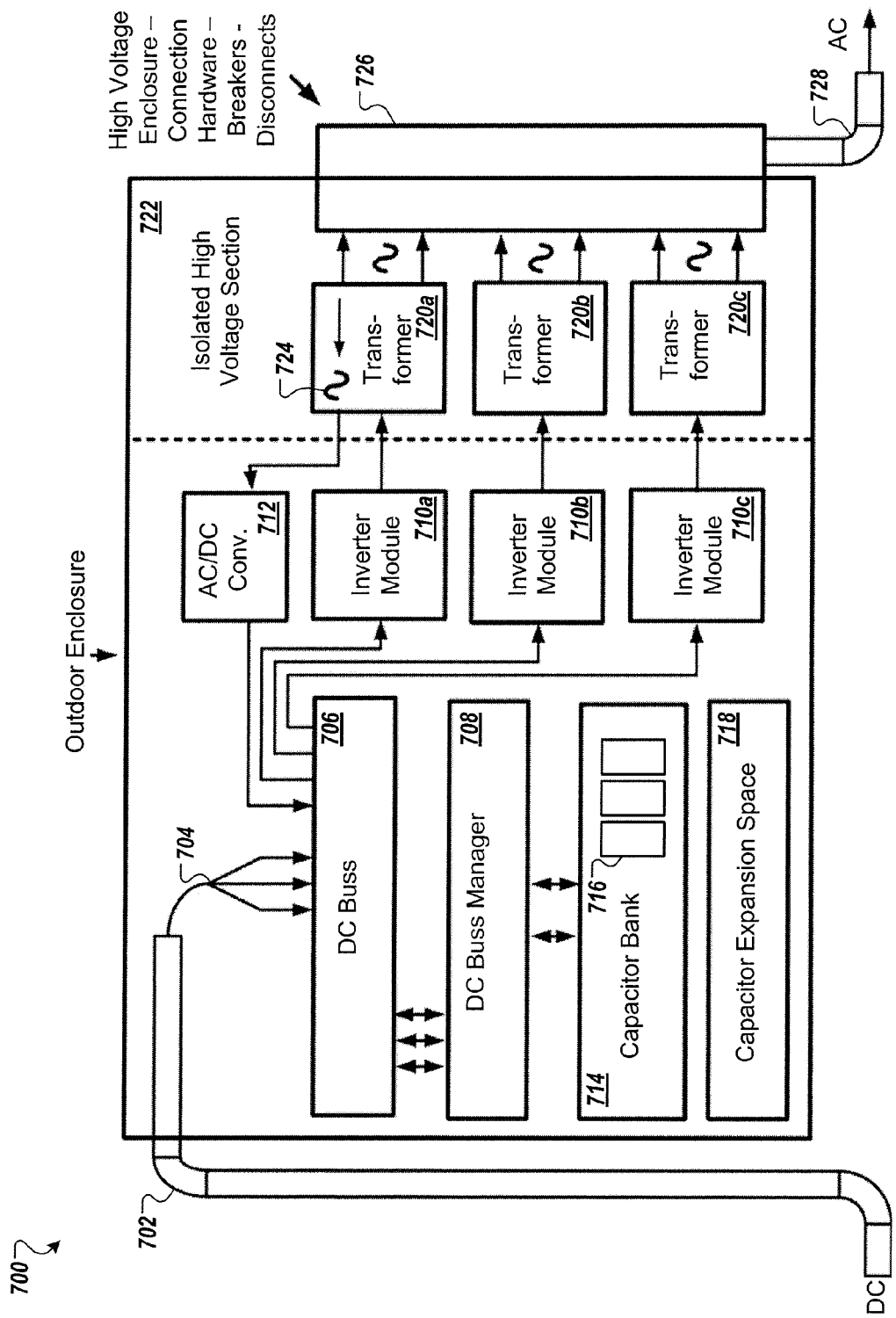
FIG. 7 shows an example outdoor enclosure for equipment for the conversion of DC to AC power.

FIG. 7 shows an example outdoor enclosure 700 that includes equipment for the conversion of DC to AC power. In some examples, the enclosure 700 may be configured to be substantially modular for quick installation, service, and replacement of one or more subcomponents. In some embodiments, the modular enclosure 700 may include quick disconnect interfaces for signal, power, and communications, which may permit an entire enclosure 700 to be installed or swapped out in minutes. In some embodiments, the transformers for each 1PGM may individually removable from the module, to reduce weight and provide flexibility for providing, for example, different numbers of phases, which may be increased over time by adding additional transformers and/or 1PGM electronics modules to the enclosure 700. Thus, the enclosure 700 may accommodate upward and downward scalability to meet the operating and budgetary demands of the facility 100.

In general, the outdoor enclosure 700 may be located in close proximity to localized sources of DC power, such as one or more energy collection nodes 120, to reduce the distances that DC power must be conducted at relatively low voltage and high current before it is converted to high voltage AC power for transmission over substantial distances (e.g., more than 50 feet) within the facility 100, for example.

The outdoor enclosure 700 depicted in this example is connected to sources of DC power through an input conduit 702. A number of DC conductors 704 pass through the input conduit 702. In some implementations, the conduit 702 may substantially protect the DC conductors 704 from physical damage, and/or be configured for rapid installation to a modular base. A DC buss manager 706 conducts DC power from the DC conductors 704 to a DC buss manager 708, a number of inverter modules 710a-710c, and an AC-DC converter module 712. In some implementations, the DC buss manager 708 can be the DC buss manager 122 of FIG. 1. In some implementations, the inverter modules 710a-710c can be inverter modules, such as the inverter module 126. In some implementations, the AC-DC converter module 712 can transform AC utility power to DC power for the operation of equipment when energy collection is low. In some examples, the AC-DC converter module 712 can include the transformer 134 and rectifier 136 combinations of FIG. 1, and/or the rectifier 246 of FIG. 2.

The DC buss manager 708 is connected to a capacitor bank 714. The capacitor bank includes one or more capacitors 716 that can be used to store and/or contribute power to the DC buss 706. The capacitor bank 714 is connected to a capacitor expansion space module 718. In some implementations, the capacitor expansion space module 718 can be used to connect increase the capacitive storage capacity available to the DC buss manager 706 by providing space and connections to add additional energy storage elements, such as the capacitor 176. The capacitor storage in the enclosure 700 provides flexibility to upgrade, service, or replace energy storage elements over time to meet and maintain the performance required, for example, by system specifications.

Each of the inverter modules 710a-710c is also connected to a transformer 720a-720c. The inverter modules 710a-710c convert the DC power from the DC buss 706 to AC power. In some implementations, each of the transformers 720a-720c can include the transformer 128.

In some implementations, the transformers 720a-720c transform the AC power to a voltage level that can be used by a utility, a utility interface (e.g., the utility interface 104 of FIG. 1), and/or downstream electrical equipment. In some implementations the transformers 720a-720c can substantially suppress one or more harmonics in the output voltage signal. In some implementations, the transformers 720a-720c can isolate the inverter modules 710a-710c from the utility.

The transformers 720a-720c are located within an isolated high voltage section 722. In some implementations, the isolated high voltage section 722 can substantially isolate the transformers 720a-720c physically and/or electrically from other components in the outdoor enclosure 700. For example, the outdoor enclosure 700 can be opened by a technician to gain access to the components 704-710 while protecting the technician from coming into contact with the transformers 720a-720c.

The transformer 720a includes an additional primary winding 724. In some implementations, the additional primary winding 724 can be used to transform utility power connected to the secondary windings into power levels that can be used by the AC-DC converter module 712 to produce DC power.

The AC outputs of the transformers 720a-720c are connected to a disconnect box 726. In some implementations, the disconnect box 726 can provide switches, breakers, fuses, lockouts, and/or other components that can be used to connect and/or disconnect AC power. AC power conductors connected to the disconnect box 726 pass out of the outdoor enclosure through an AC conduit 728.

Although the outdoor enclosure 700 is illustrated as including three AC outputs, other numbers of outputs can be used. In some implementations, the inverter modules 710a-710c can be phased independently. For example, the three inverter modules 710a-710c can be configured to produce a three phase output. In some implementations, some, all, or none of the inverter modules 710a-710c can be synchronized to output a single phase. For example, the inverters 710a-710c can be synchronized to output a combined, single phase AC signal that is greater than an individual inverter module can produce on its own.

In some implementations, various combinations of synchronization and non-synchronization of the inverter modules 710a-710c can provide flexibility within an energy collection facility such as the energy collection facility 100 of FIG. 1. For example, the outdoor enclosure can be configured for three-phase output early in the construction of the energy collection facility. As additional ECNs and outdoor enclosures 100 are deployed, the enclosure 100 can be reconfigured to output a single phase (e.g., a first phase). A second installation of the outdoor enclosure 100 can be configured to output a second phase, and a third installation can be configured to output a third phase. In another example, the phasing of the outdoor enclosure 100 can be reconfigured to overcome an outage in a set of ECNs or other instances of the outdoor enclosure 100, or to help stabilize unbalanced electrical phases.

Figure 8:
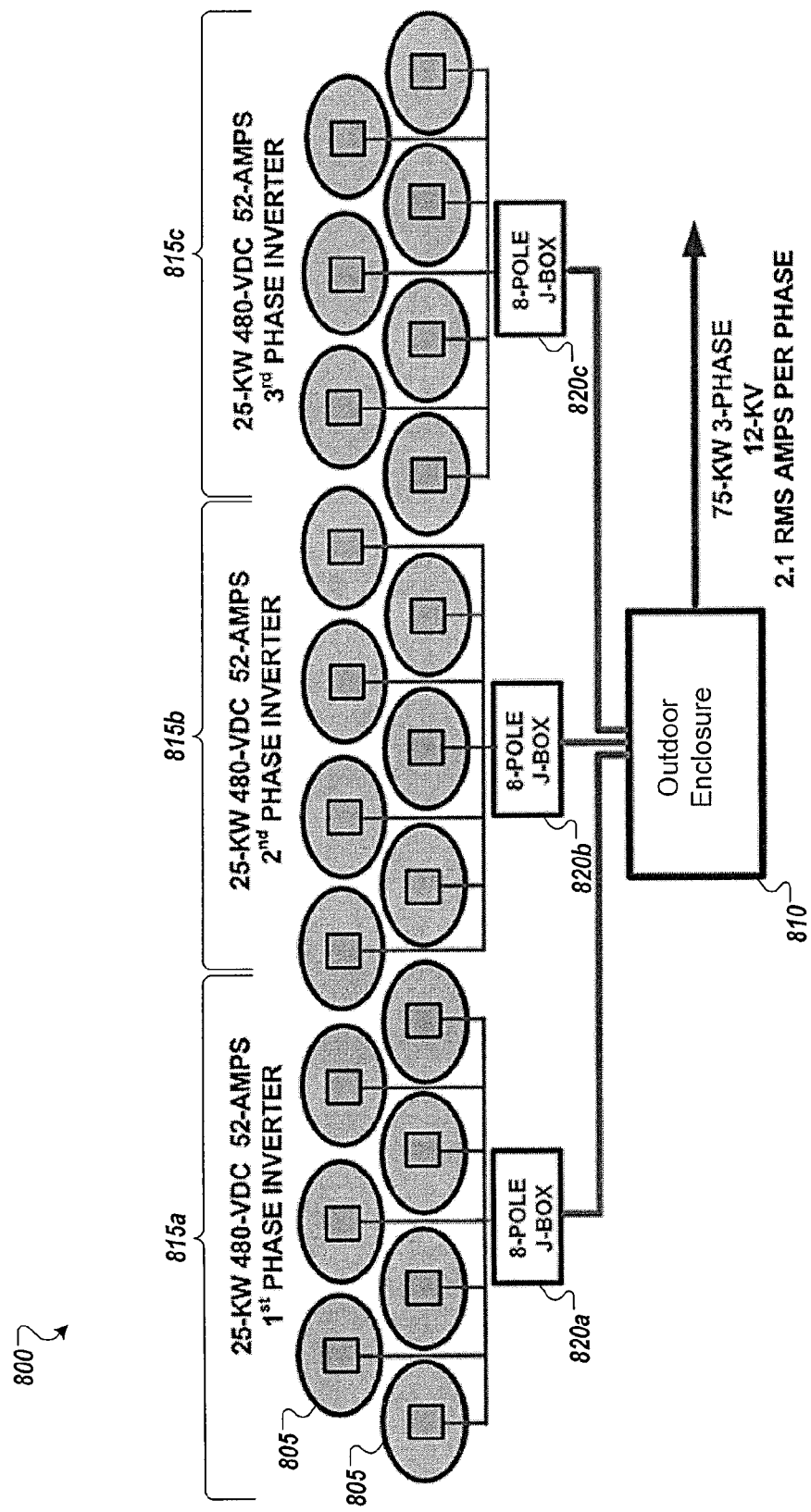
FIG. 8 shows an example collection of ECNs that collect power for DC-AC conversion by an outdoor enclosure.

FIG. 8 shows an example collection 800 of ECNs 805 that collect power for DC-AC conversion by an outdoor enclosure 810. In general, the DC power collected by the ECNs 805 is combined and conducted to the outdoor enclosure 810, where the DC power is converted to three phase AC power.

The ECNs 805 are collected into three groups 815a-815c, wherein the outputs of each of the ECNs 805 is combined at a junction box 820a, 820b, and 820c. Each of the groups 815a-815c in this example is rated to produce 25 KW of DC power (e.g., 480VDC at 52 A) for a total of 75 KW.

The DC power is conducted to the outdoor enclosure 810. In some implementations, the outdoor enclosure 810 can be the outdoor enclosure 700 of FIG. 7. The outdoor enclosure 810 converts the three DC inputs to three 12KVAC, 2.1 A RMS phases for a total of 75 KW of three phase AC power.

Figure 9:
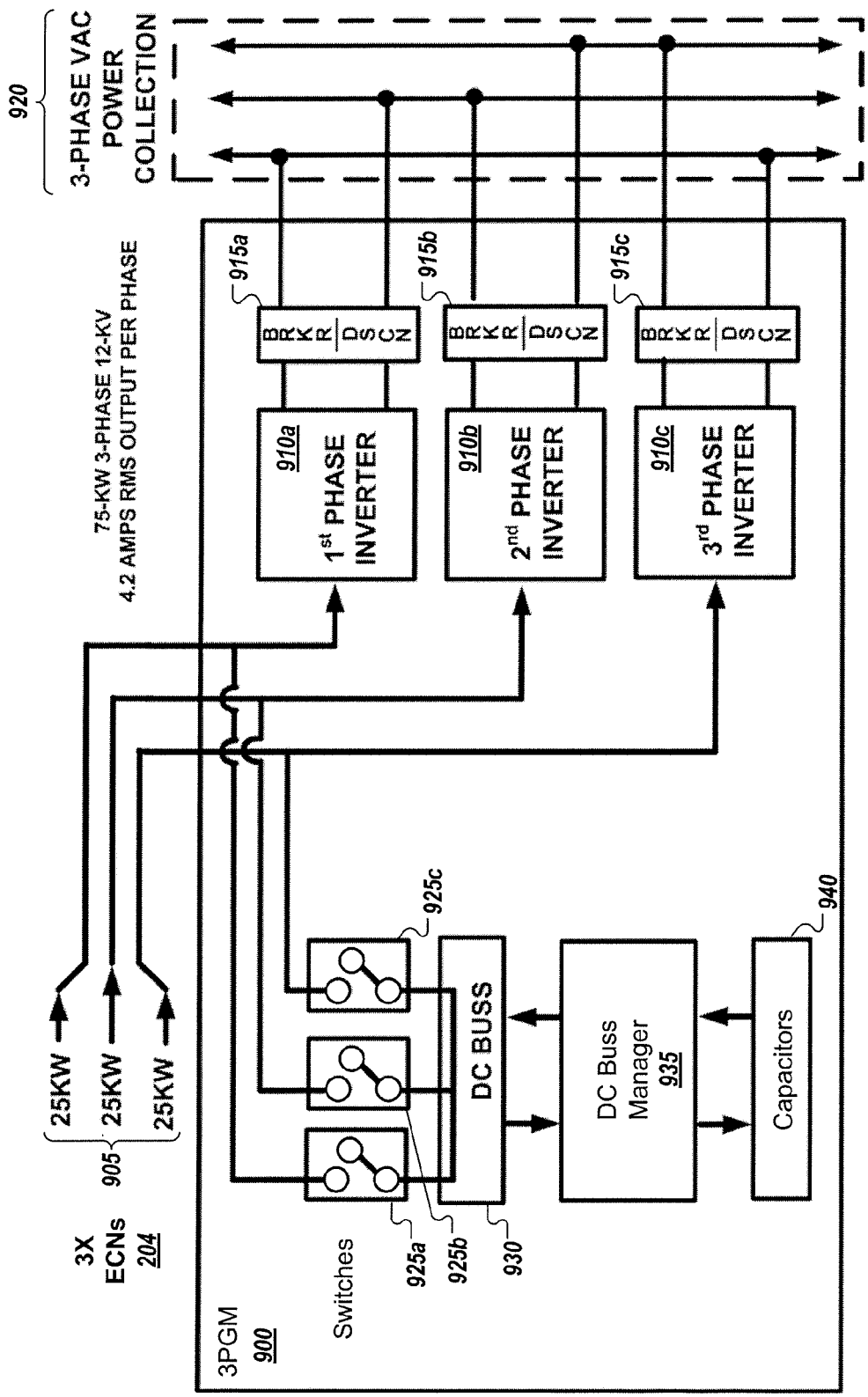
FIG. 9 shows an example 3PGM for the conversion of DC power to three phase AC power.

FIG. 9 shows an example 3PGM 900 for the conversion of DC power to three phase AC power. Each of the ECNs provides a 25 KW DC supply 905. Each of the 25 KW DC supplies 905 is connected to an input of an inverter module 910a, 910b, and 910c. The inverters 910a-910c convert the three DC inputs to three 12KVAC, 2.1 A RMS phases for a total of 75 KW of three phase AC power. The AC outputs of the inverter modules 910a, 910b, and 910c are each connected to a disconnect module 915a, 915b, and 915c, respectively. The AC outputs then pass onto the three phases of a three phase AC power collection bus 920.

The DC inputs of the inverter modules 910a, 910b, and 910c are also electrically connected to a set of switches 925a, 925b, and 925c. The switches 925a-925c are, in turn, connected to a DC buss 930. In some implementations, the switches 925a-925c can be configured to cause DC power to be shared among two or three of the illustrated DC busses.

The DC buss 930 is electrically connected to a DC buss manager 935. In some implementations, the DC buss manager 935 can be the DC buss manager 122 of FIG. 1. The DC buss manager 935 is electrically connected to a capacitor 940 in order to store energy from the DC buss 930 and/or to add energy to the DC buss 930.

Figure 10:
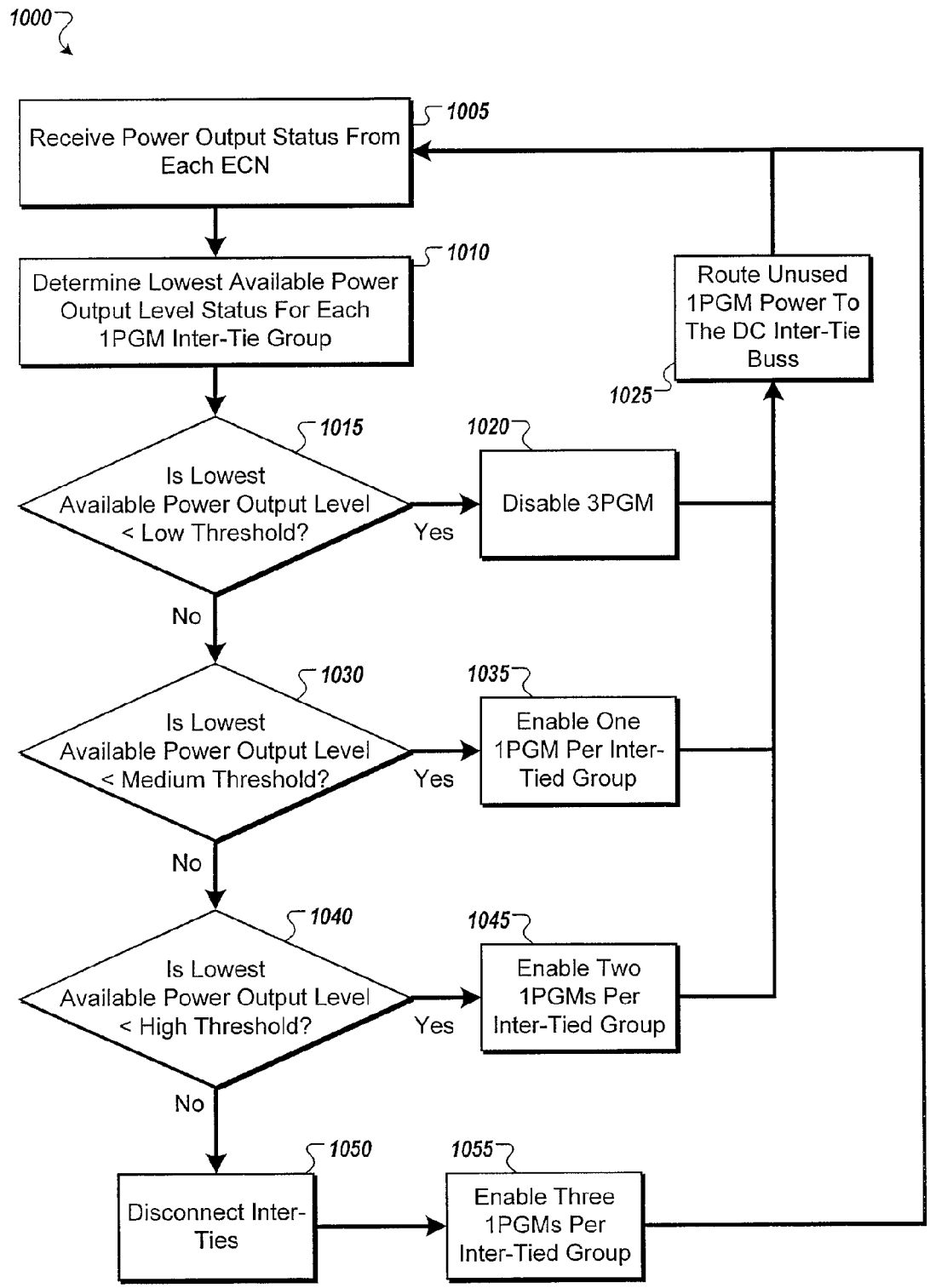
FIG. 10 shows an example process for the management of DC power in a 3PGM.

FIG. 10 shows an example process 1000 for the management of DC power in a 3PGM, such as the 3PGM 110 of FIG. 1. Steps of the process may be monitored and/or controlled by one or more elements working in combination and including, by way of example, and not limitation, a programmed device (a microprocessor, microcontroller, logic array, ASIC (application-specific integrated circuit), alone or in combination with analog and/or mixed-signal components. In some embodiments, steps of the process may be implemented upon execution in hardware of a program of instructions, which may contain one or more program modules, which program of instructions may be tangibly embodied in a tangible media, such as a data store (e.g., non-volatile or volatile memory, rotating or fixed storage media).

The process 1000 starts when a DC buss manager, such as the DC buss manager 122, receives 1005 a power output status from each ECN in the 1PGM inter-tie group. The DC buss manager then determines 1010 the lowest available power output level status for each 1PGM inter-tie group. For example, in a collection of three 1PGM inter-tie groups, one group may have the lowest total power output of the collection, and that lowest power output value will be used for subsequent operations in the process 1000.

If it is determined 1015 that the lowest available power output level is below a low threshold, then the 3PGM is disabled 1020 and unused 1PGM power is routed 1025 to the DC inter-tie buss.

If it is determined 1015 that the lowest available power output level is not below the low threshold, then if it is determined 1030 that the lowest available power output level is below a medium threshold, then 1PGM of each inter-tie group is enabled 1035.

If it is determined 1030 that the lowest available power output level is not below the medium threshold, then if it is determined 1040 that the lowest available power output level is below a high threshold, then two 1PGMs of each inter-tie group are enabled 1045.

If it is determined 1040 that the lowest available power output level is not below the high threshold, then the inter-tie busses may be selectively disconnected 1050. All three 1PGMs in the inter-tie groups are then enabled 1055.

In some embodiments, the flow of DC power among 1PGMs within an inter-tie group 118 may be controlled by selectively deactivating any selected one of the inverters 126. Accordingly, in some examples, selective disconnection of an inverter may not implicate opening of a relay or other switching element in the corresponding 1PGM 112.

Figures 11A, 11B, 11C:
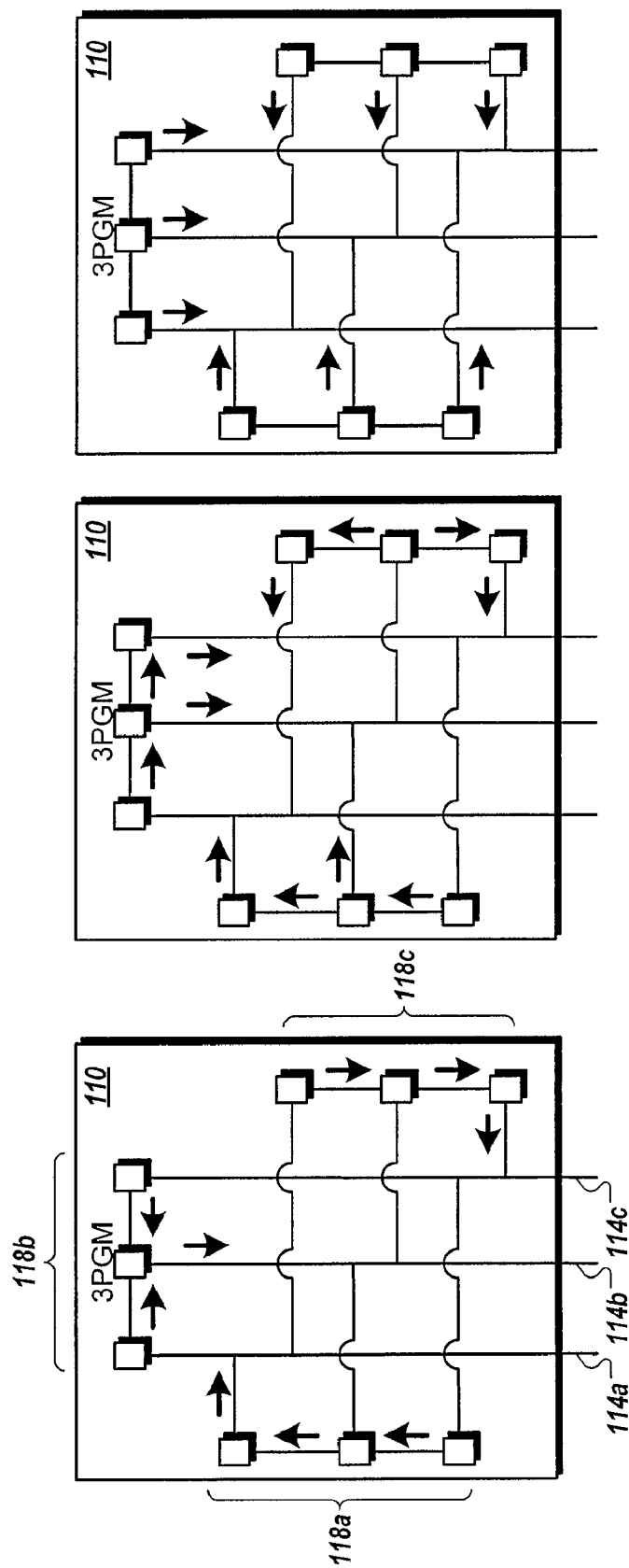
FIGS. 11A-11C illustrate the configurations of 1PGMs and DC inter-tie busses in a 3PGM at various DC power levels.

FIGS. 11A-11C illustrate the configurations of 1PGMs and DC inter-tie busses in a 3PGM at various DC power levels. In some implementations, the configurations can be the results of the process 1000 of FIG. 10.

FIG. 11A shows an example 3PGM 110 low-power configuration, which is in accordance with the step 1035 of FIG. 10. In some examples, the illustrated configuration can be used when DC power collection levels are below a medium threshold to route substantially all of the DC power in a 1PGM inter-tie group through a single 1PGM. In some implementations, increased 1PGM efficiencies may be obtained by routing DC power through fewer than three of the 1PGMs in the 1PGM inter-tie group.

In the illustrated example, the 1PGM inter-tie group 118a is configured to route its DC power to a single 1PGM which is enabled for the first phase AC buss 114a. The 1PGM inter-tie group 118b is configured to route its DC power to a single 1PGM that is enabled for the second phase AC buss 114b, and the 1PGM inter-tie group 118c is configured to route its DC power to a single 1PGM that is enabled for the third phase AC buss 114c. In some implementations, the AC busses 114a-114c can include the three phases of the three phase AC buss 106 of FIG. 1.

FIG. 11B shows the 3PGM 110 in an example medium-power configuration, which is in accordance with the step 1045 of FIG. 10. Each of the 1PGM inter-tie groups 118a-118c routes DC power to two of the three 1PGMs in each group, such that two 1PGMs from separate 1PGM inter-tie groups are enabled for each AC buss 114a-114c. For example, the first phase AC buss 114a is supplied by 1PGMs from the 1PGM inter-tie groups 118a and 118c, the second phase AC buss 114b is supplied by the 1PGM inter-tie groups 118a and 118b, and the third phase AC buss 114c is supplied by the 1PGM inter-tie groups 118b and 118c.

FIG. 11C shows the 3PGM 110 in an example high-power configuration, which is in accordance with the step 1055 of FIG. 10. In this configuration, all the 1PGMs in each of the three 1PGM inter-tie groups 118a-118c are enabled for the three AC busses 114a-114c. In some implementations, the DC inter-tie busses can be disconnected between the 1PGMs. In other implementations, the DC inter-tie busses can remain connected to allow the 1PGMs to operate from a common DC power level and/or to share the management of the DC inter-tie buss.

The foregoing operations described with reference to FIGS. 10-11 may be scaled according to the maximum number of available phases (e.g., 2, 4, 5, 6, 24) and the number of available output lines.

Figure 12:
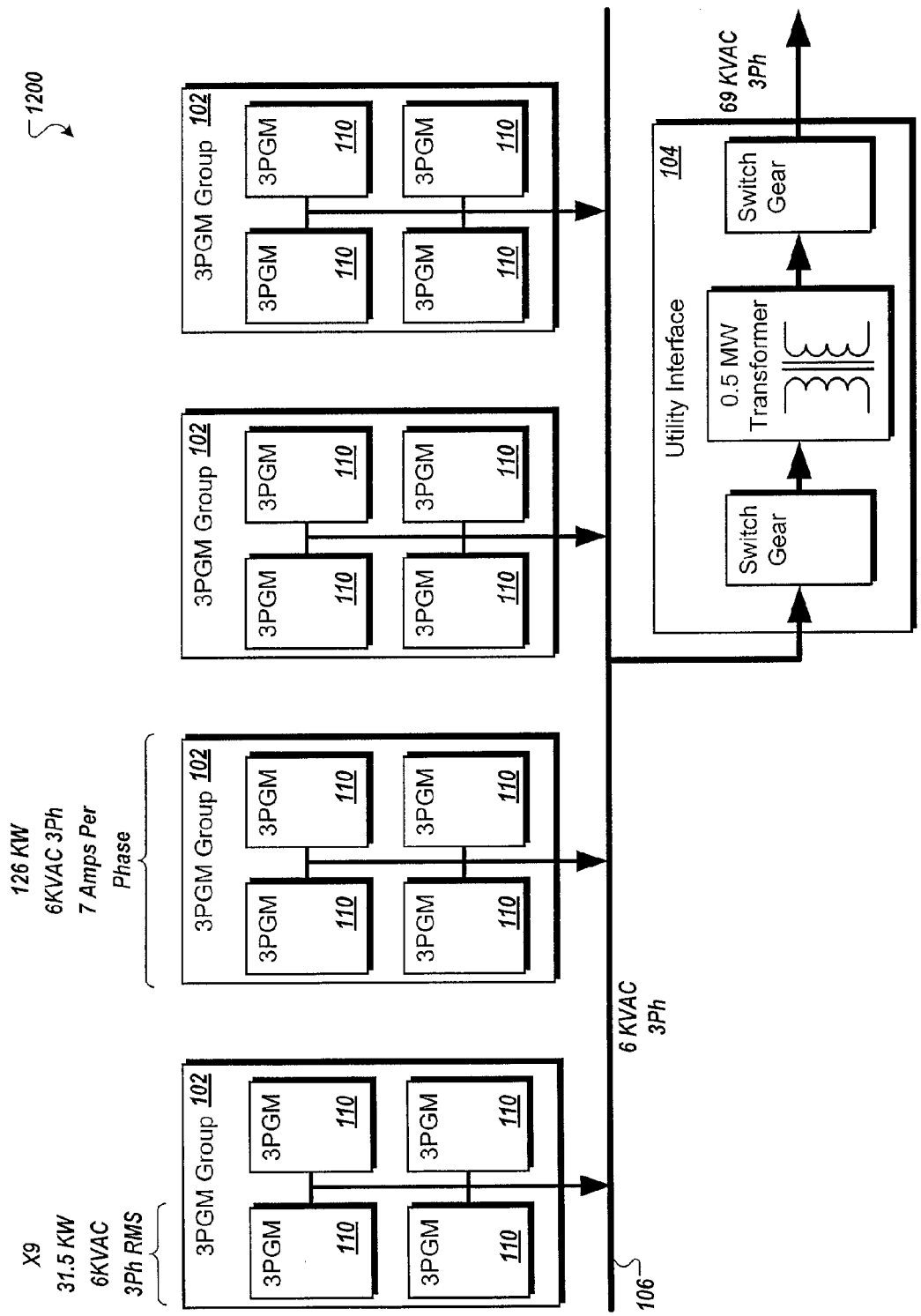
FIG. 12 shows an example collection of 3PGM groups powering a three phase AC buss.

FIG. 12 shows an example collection 1200 of 3PGM groups powering a three phase AC buss. The collection includes four of the 3PGM groups 102 of FIG. 1, wherein each of the 3PGM groups 102 includes four 3PGMs 110. In the illustrated example, each 3PGM 110 produces 31.5 KW of 6KVAC three phase RMS power. The 3PGM group therefore produces 4×31.5 KW, or 126 KW at 6KVAC three phase RMS.

The four 3PGM groups 102 add their power to the 6KVAC three phase buss 106. The buss 106 is connected to the utility interface 104. The utility interface 104 includes a 0.5 MW transformer, which transforms the power on the buss 106 from 6KVAC to 69KVAC, and further includes appropriate switching gear. In some implementations, by stepping electrical power up to higher AC voltages, power can be transmitted with reduced power loss, voltage drop, and infrastructure cost compared to transmitting the same power at lower voltage and higher current.

Figure 13:
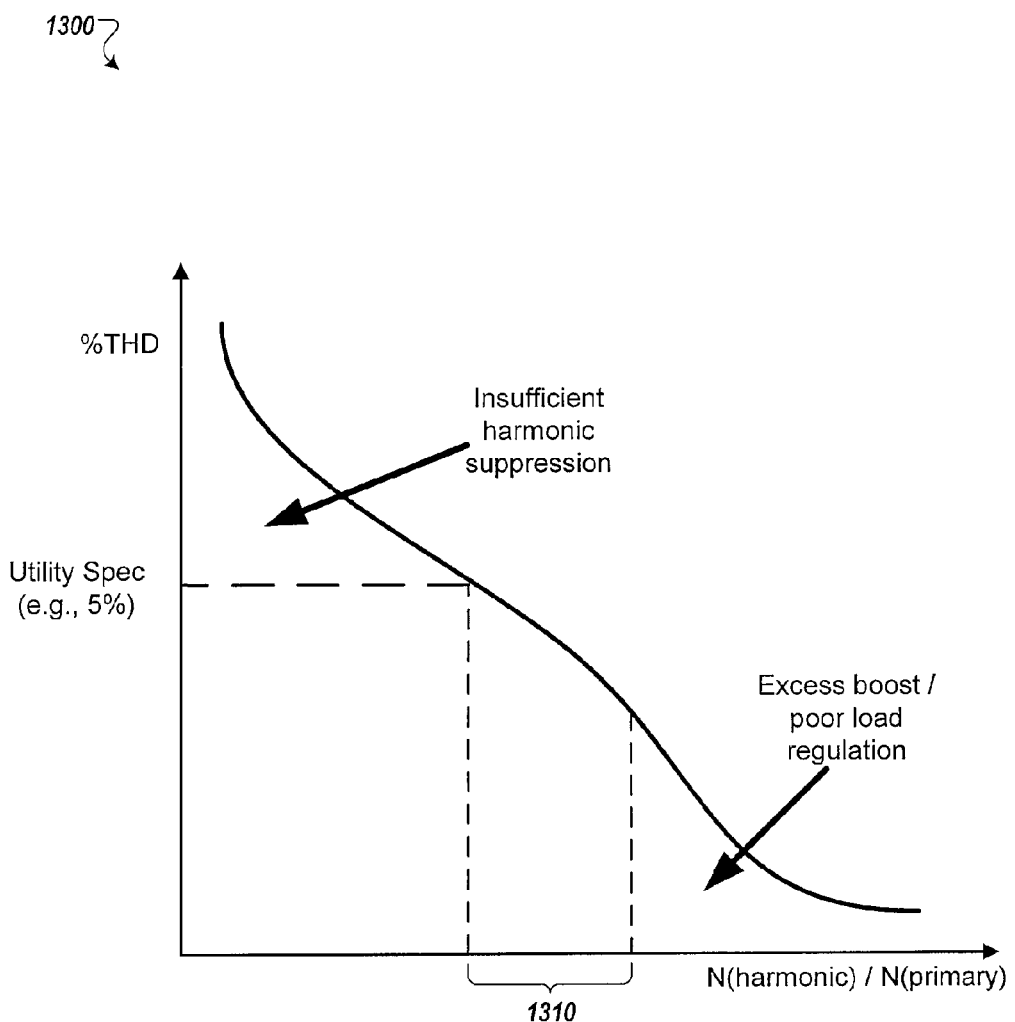
FIG. 13 shows a chart that represents an example relationship between transformer winding ratios and THD for a harmonic-suppressing transformer.

FIG. 13 shows a chart 1300 that represents an example design relationship showing the dependence of THD on a turns ratio between the harmonic suppression winding and the primary winding of the transformer 128 in the 1PGM 112 of FIG. 1, for example. With reference to FIG. 5B, the chart 1300 has an x-axis that represents a range of ratios between the number of turns on the harmonic suppression winding 555 to the number of turns on the primary winding 505 in the transformer 550. The y-axis represents a range of % THD values.

In general, experimentation suggests that some embodiments may generally exhibit high % THD levels at low ratios of harmonic winding-to-primary turns. The % THD levels generally tend to decrease with increasing ratios of harmonic winding-to-primary turns. However, experimental results suggest that there may be a preferred design range 1310 of winding ratio values. Below the range 1310, % THD values may exceed a predetermined upper limit specification, such as a maximum % THD (e.g., about 0.001%. 0.01%, 0.1%, 1%, 5%, 7%, 10%) that may be required by an operator of an electrical distribution system (e.g., utility grid). If the winding ratio is above the range 1310, the 1PGM 112 may output excessive voltage boost, and/or the system may exhibit poor load regulation. In some implementations, by appropriate selection of the turns ratio of the ratios of harmonic winding-to-primary turns, and/or by matching the harmonic winding to a suitable capacitance, various embodiments may substantially suppress a selected harmonic signal on the voltage output waveforms on the secondary 510.

Although exemplary embodiments have been described with reference to the figures, other implementations are possible. For example, in some examples, the energy collection facility 100 may interface selectively with one or more predetermined electric power distribution networks, some or all of which may be substantially independent. In an example, the facility 100 may be configured to supply three-phase transmission-level AC power to two different public utilities at different transmission voltages (e.g., 30 kV, 50 kV respectively), frequencies, configurations (e.g., WYE- or Delta-type configurations) and phasings, while simultaneously being configured to provide medium voltage (e.g., 6 kV) 5 phase AC power to a proprietary local load (e.g., smelting plant, automotive factory). Through appropriate control of switchgear and control of the phasing, frequency, and power flow routing through the DC Buss Managers 122 and inverters 126 of the various 1PGMs 112 and the 3PGMs 110, facility transmission busses 106 may carry substantially independent AC power for distribution through the utility interface 104.

The 3PGM groups 102 are shown in various examples above as including four 3PGMs 110 that each output a three-phase AC Buss 106. In other implementations, 3PGM Groups 102 may include more or fewer numbers of 3PGMs 110. In various implementation, the 3PGM group may include about 2, 3, 5, 6, 7, 8, 9, 10, 12, 15, 20, 25 or more 3PGMs 102, with output AC buss 106 that may carry a preselected number of phases, and the phases of the constituent 3PGMs 110 in each 3PGM Group 102 may be combined or maintained in parallel. In such examples, the number of phases may be different than three, and may vary in different portions of the energy collection facility 100.

In operation, the 1PGMs 112 may be operated such that selected inverters may be deactivated and DC power re-routed via an inter-tie buss 116 to one or more other selected members of the inter-tie group 118. Accordingly, each 3PGM can provide one, two, or any number of phases up to the number of elements in the inter-tie group 118. Thus, the energy collection facility can dynamically reconfigure the format of the AC power supplied to the utility interface 104. Intelligent monitoring of voltage and currents generated by each 1PGM, for example, can be used by the Control 108 to maintain substantially balanced operation of the subsystems within the facility 100.

Various examples have described the use of energy Storage elements to capture excess available output power from the energy collection nodes in each 1PGM 112 to store in an energy storage element, such as the element 124 within the same 1PGM 112. In other embodiments, the DC buss manager may be configured to route excess energy from one 1PGM 112 for storage in a different 1PGM 112, or in a supplemental energy storage element (e.g., flywheel) in a central location to receive energy from within a 3PGM 110, a 3PGM group 102, or from anywhere within the energy collection facility 100.

In various examples, a portion of the available output energy generated within each 1PGM 112 may be diverted to storage during off-peak times for subsequent recovery during peak demand times on the electric distribution grid.

In various embodiments, the facility controller 108 may route power flows of available energy between energy storage and distribution to the utility grid so as to substantially maximize operating revenue based on electricity schedules. For example, if the utility offers higher pricing under high demand conditions, the facility 100 can earn more revenue by increasing the energy storage levels by delivering the stored energy to meet peak load demands.

Various embodiments convert low-voltage DC electrical power to high-voltage AC electrical power at line frequency (e.g., about 50 or 60 Hz) for supply to an electric distribution system. Various examples perform the conversion with high efficiency and without high-frequency switch-mode inverters and without secondary step-up transformers. In particular examples, the source of DC power includes an array of solar-electric generators. An exemplary large-scale generation architecture uses a distributed network of small rugged inverters to convert DC power from a set of solar electric units to medium or high voltage AC at line frequency, where each inverter is located proximate to the set of solar electric units, thereby reducing current carrying requirements of transmission cables. Medium or high voltage AC output power from a number of the inverters can be combined for delivery to the electric utility grid. Some implementations include an exemplary DC buss stabilization system that uses capacitive energy storage to supply energy requirements during power output transients from the solar arrays. Other features and embodiments are described below. Various examples are described with reference to examples depicted in the attached FIGS. 1-9.

An electrical switching technology, referred to herein as ADCP, may substantially improve the controllability and efficiencies of inductive devices such as transformers and electric motors. For example, ADCP switching technology may promote the technical and economic viability of various solar generation technologies. Examples of ADCP switching apparatus and methods are described in U.S. patent Ser. No. 11/582,115, entitled "Supply Architecture for Inductive Loads," as filed on Oct. 16, 2006 by Babcock et al., the entire contents of which are fully incorporated by reference herein.

Certain embodiments may provide one or more advantages. In some embodiments, a sun-focused solar array may be included in implementations with improved efficiency and/or cost effectiveness. The amount of real power produced per square foot of area exposed to the sun may be great enough to make solar energy production competitive with more traditional types of electrical generation (e.g., fossil fuel-derived generation).

In various implementations, ADCP switching technology may advantageously reduce infrastructure costs by substantially reducing wire size and hardware requirements. ADCP may provide intelligent and highly controllable performance that can, for example, improve voltage regulation with high conversion efficiencies. Some examples operate substantially without batteries and without typical high frequency switch-mode inverter modules. ADCP may substantially reduce the likelihood for catastrophic system failures. Some embodiments may exhibit very long, low maintenance expected life spans, which may substantially exceed thirty years in some cases. Various implementations may provide substantially reliable and rugged performance across wide ranges of temperature and environmental conditions. Various examples meet applicable utility company safety, quality, emission requirements, and standards.

ADCP and certain semiconductor switch designs may be used to improve the electrical efficiencies of standard 60 Hz transformers and inductors by substantially reducing or eliminating electrical resonance, using reverse electromotive force (EMF) as a secondary source of electrical energy and substantially eliminating or reducing reverse electromotive force as a source of electrical impedance and electromagnetic emissions. Examples of electronics for processing electrical power as described herein are disclosed in U.S. patent Ser. No. 11/582,115, entitled "Supply Architecture for Inductive Loads," as filed on Oct. 16, 2006 by Babcock et al., the entire contents of which are fully incorporated by reference herein. Various semiconductor switch designs are bi-directional and can efficiently invert DC source supply current to bi-directional DC current that is used to power AC 60 Hz transformers.

In some implementations, high isolation semiconductor switch designs may be used to control super capacitors for the purpose of replacing batteries as regulation and storage devices, substantially stabilize voltage fluctuations, and/or reduce or substantially eliminate high voltage spiking on DC distribution busses. For example, improved buss stability may advantageously be achieved in applications having long DC buss cable runs that could be a source of buss instability associated with, for example, reverse EMF, voltage swings, or high-voltage spiking ranging into the thousands of volts.

In an exemplary implementation, DC to AC conversion is performed by a number of small-scale inversion systems distributed in close proximity to sets of one or more solar-electric sources. The small-scale inversion systems would convert solar DC electrical power directly to 60 Hz AC high utility voltages in close proximity to the solar DC electrical sources and then the solar electrical energy can be transported as AC current on an AC electrical power system to the utility grid at higher transmission voltages and a lower infrastructure cost. In an illustrative example, a number of smaller DC busses may substantially replace large-scale DC buss design. Such DC busses can carry a limited current (e.g., less than about 20 Amps) over limited distance runs (e.g., less than about 100 feet). Systems that use such smaller DC busses may substantially reduce the size and cost of any DC buss requirements, and/or substantially reduce the potential for catastrophic failure.

For example, a fault in one of the distributed inverters may take only the associated solar arrays off-line. In some examples, DC switchgear may automatically route the DC output power from one set of solar arrays that has a faulted inverter to a nearby set of solar arrays with an operative inverter.

In an exemplary embodiment of an ADCP Inversion Switch, the ADCP process may be a substantially non-resonant way of manipulating electrical energy for improving inductor control and efficiency by having substantial control of rising and falling magnetic states within an inductive element (e.g., a transformer).

In an illustrative example, reverse EMF is effectively removed as a source of impedance to source current flow within an inductor. The reverse EMF is captured and harnessed to produce work and electrical charge that is used to improve inductor efficiency. This is accomplished with switching technology and a multi-state switching process that converts DC source electrical power to bi-directional DC current that is pulse width modulated (PWM) and controlled. The multi-state switching process also controls and uses reverse EMF as a source of increased inductor efficiency and also eliminates reverse EMF as a source of electrical noise and electromagnetic interference (EMI). The switching technology generates substantially reduced levels of conducted and/or radiated EMI.

In some examples, the ADCP inversion switch operates at line frequency (e.g., 60 Hz) coupled with a line frequency utility grade transformer to invert DC electrical power to utility grade AC electrical power at utility transmission voltages.

In some embodiments, the ADCP inversion switch may be used with lighting control systems for HID (high intensity discharge) ballast type (e.g., including a transformer) lighting, metal halide, high-pressure sodium, and florescent lighting. For example, a 60 Hz HID lamp ballast may operate with improved efficiency from a DC source supply and an ADCP inversion rather than operating the lamp ballast from 120 VAC wall current.

In some exemplary embodiments, a wireless communications system may interconnect among ECNs 120 (e.g., solar collection controls), DC Buss Manager 122, and inverter 126 within a 1PGM 112, and/or among 1PGMs 112, 3PGMs 110, 3PGM Groups 102, and/or control 108, for example. Communication and control of an area wide power generation system of this nature is another infrastructure cost and consideration. The inversion system design may use artificial intelligence. Communications, control and data acquisition involve some route of communications such as a LAN network that connects all the systems and devices over a large geographical area along with communication protocols that interface the entire system to a central control point.

Such a communication network may be wired, optical, and/or wireless. In some examples, a hardwired network such as Ethernet or token ring, may carry digital data to and from every solar electric carousel and the associated inversion equipment. Some examples use high-frequency wireless technology for communications over wide geographical areas. Wireless communications can be used to traffic large amounts of digital data between hundreds, if not thousands, of different units in the overall power generation system. Low cost transmitter receivers could be built into the individual inversion switch, Buss Manager 122 (e.g., in the control for actuating the energy collection node 120). In one example, the DC inter-tie buss 116 may be used for data transmission and collection among 1PGMs 112 coupled to that inter-tie bus 116.

In a wireless (e.g., cellular phone) implementation, a central transmitter receiver may connect to a server that provides interface and control information to a plurality of the elements of the facility 100, which elements may be spread over a wide area. Many megawatts of electrical power generation could be electronically monitored (e.g., to gather real-time system information) and automatically controlled in a sophisticated manner according to the methods and apparatus described herein.

In some embodiments, 1PGMs may communicate through the power utility grid. For example, the 1PGMs may convert communication messages into signals that use the AC line frequency of the power utility grid as a carrier frequency, and the communication messages may be modulated as a higher frequency signal that propagates with the carrier. In some embodiments, powerline communications may follow existing standards. For example, powerline communications may conform to the Consumer Electronics Powerline Communications Alliance (CEPCA) standard, the ETSI Power Line Communications (PLT) standards, the HomePlug Powerline Alliance standards, IEEE P1675, IEEE P1775, IEEE P1901, the Open PLC European Research Alliance (OPERA) standards, POWERNET standards, Universal Powerline Association (UPA) standards, and/or other standards for power line communications.

A number of implementations have been described. Nevertheless, it will be understood that various modifications may be made without departing from the spirit and scope. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A method of shaping a current waveform for supply to a transformer primary winding, the method comprising:
   constructing a current waveform that comprises a sequence of current signals of alternating polarity, the constructed waveform having a period corresponding to a fundamental frequency, wherein each current signal is formed within one-half of one period by performing steps comprising:
   (i) turning on a switch corresponding to a polarity of the current signal being constructed;
   (ii) increasing a current supplied from an output node from substantially zero to a first current level by discharging a capacitance until the voltage on the capacitance substantially matches a voltage of a first voltage source;
   (iii) increasing the current from the first current level to a second current level by connecting the output node substantially directly to the voltage source;
   (iv) turning off the switch once; and,
   (v) decreasing the current to substantially zero by directing the current that continues to flow after the switch turns off to recharge the capacitance; and,
   supplying the constructed waveform to a first winding of a transformer.

2. The method of claim 1, further comprising generating an output voltage at a second winding of the transformer in response to supplying the constructed waveform to the first winding of the transformer.

3. The method of claim 2, further comprising substantially attenuating a kth harmonic of the output voltage, where k is an odd number.

4. The method of claim 3, wherein substantially attenuating a kth harmonic of the output voltage comprises providing a magnetomotive force at the kth harmonic associated with a third winding in the transformer to interact with a magnetomotive force at the kth harmonic associated with the constructed current waveform.

5. The method of claim 4, wherein providing a magnetomotive force at the kth harmonic associated with a third winding in the transformer comprises shifting a phase of the magnetomotive force at the kth harmonic to be substantially out of phase with respect to the magnetomotive force at the kth harmonic associated with the constructed current waveform.

6. The method of claim 1, further comprising receiving electrical power from a renewable energy source to supply at least a portion of the energy for the first voltage source.

7. The method of claim 1, further comprising selecting the fundamental frequency to substantially match a fundamental frequency of a utility line voltage.

8. A system for generating high quality alternating current (AC) electrical power for supply to a high voltage electric power distribution network, the system comprising:
   an energy collection node to convert a naturally occurring form of energy to electrical energy;
   an energy processing module that converts the converted electrical energy to an alternating current signal having energy at a fundamental frequency and at least one harmonic of the fundamental frequency;
   a transformer comprising:
   (i) a first winding that receives the alternating current signal;
   (ii) a second winding that outputs AC power by delivering the power in the form of a substantially sinusoidal voltage signal;
   (iii) a third winding; and
   a harmonic suppression module coupled to the third winding and responsive to the alternating current in the first winding, and further configured to substantially offset the energy coupled from the first winding to the second winding at the at least one harmonic frequency.

9. The system of claim 8, wherein the harmonic suppression module comprises a capacitor.

10. The method of claim 8, wherein the harmonic suppression module offsets the energy by shifting the phase of at least one selected harmonic of the flux to substantially oppose flux at the selected harmonic from coupling to the second winding.

11. The system of claim 8, wherein the voltage and current at the fundamental frequency in the third winding are approximately 90 degrees out of phase.

12. The system of claim 8, wherein the power delivered from the second winding is at least about 1 kilowatt.

13. The system of claim 8, wherein the voltage supplied from the second winding is above at least 500 Volts.

* * * * *